(12) United States Patent
Mayadas et al.

(10) Patent No.: US 11,816,664 B2
(45) Date of Patent: Nov. 14, 2023

(54) COMPUTER NETWORK SYSTEMS ADMINISTERING CRYPTOGRAPHICALLY-SECURED, TOKEN-BASED SUBSTITUTION MANAGEMENT AND METHODS OF USE THEREOF

(71) Applicant: Broadridge Financial Solutions, Inc., Newark, NJ (US)

(72) Inventors: Vijay Mayadas, New York, NY (US); John Garahan, Annandale, NJ (US); Horacio Barakat, New York, NY (US); Hrishikesh Nashikkar, Hyderabad (IN); Kishore Seshagiri, Hyderabad (IN)

(73) Assignee: Broadridge Financial Solutions, Inc., Newark, NJ (US)

( * ) Notice: Subject to any disclaimer, the term of this patent is extended or adjusted under 35 U.S.C. 154(b) by 0 days.

(21) Appl. No.: 16/174,589

(22) Filed: Oct. 30, 2018

(65) Prior Publication Data
US 2019/0340609 A1    Nov. 7, 2019

Related U.S. Application Data

(60) Provisional application No. 62/668,144, filed on May 7, 2018.

(51) Int. Cl.
*G06Q 20/38* (2012.01)
*G06Q 20/36* (2012.01)
*H04L 9/32* (2006.01)

(52) U.S. Cl.
CPC ......... *G06Q 20/3827* (2013.01); *G06Q 20/36* (2013.01); *H04L 9/3236* (2013.01); *G06Q 2220/00* (2013.01)

(58) Field of Classification Search
CPC ................... G06Q 20/00–425; H04L 9/00–50
See application file for complete search history.

(56) References Cited

U.S. PATENT DOCUMENTS

| | | |
|---|---|---|
| 2017/0011460 A1 | 1/2017 | Molinari et al. |
| 2017/0109735 A1* | 4/2017 | Sheng ................ G06Q 20/3678 |

(Continued)

OTHER PUBLICATIONS

Extended European Search Report issued by the European Patent Office dated Sep. 12, 2019 in European Patent Application No. 19173077.9 (10 pages).

*Primary Examiner* — Mohammad A. Nilforoush
(74) *Attorney, Agent, or Firm* — GREENBERG TRAURIG, LLP

(57) ABSTRACT

A present disclosure provides an exemplary system that includes at least: a distributed blockchain environment, including: a plurality of externally owned presence (EOP) member nodes associated with a plurality of distinct entities, a cryptographically-secured distributed ledger; a plurality of electronic wallets (e-Wallets), configured to hold records of distributed leger collateral (DLC) tokens; a plurality of self-contained self-executing software containers (SESCs), including: first-type SESCs, second-type SESCs, and third-type SESCs; where the DLC tokens are used by the distributed blockchain environment; where the first-type SESCs, the second-type SESCs, and the third-type SESCs are distinct SESCs; where each DLC token include at least one unique entity-identifying cryptographic hash; where, for each respective transaction associated with a respective EOP member node, a respective computer invokes the first-type SESCs and the third-type SESCs to cryptographically administer each respective transaction within the distributed blockchain environment.

24 Claims, 25 Drawing Sheets

(56) References Cited

U.S. PATENT DOCUMENTS

2017/0140408 A1    5/2017  Wuehler
2017/0300876 A1   10/2017  Musiala, Jr. et al.
2018/0091316 A1*  3/2018  Stradling ........... G06Q 20/3829
2018/0260909 A1*  9/2018  Li ......................... G06Q 40/12

* cited by examiner

COMPUTER NETWORK SYSTEMS ADMINISTERING CRYPTOGRAPHICALLY-SECURED, TOKEN-BASED SUBSTITUTION MANAGEMENT AND METHODS OF USE THEREOF

CROSS-REFERENCE TO RELATED APPLICATIONS

The present application claims priority from U.S. Provisional Patent Application No. 62/668,144 filed May 7, 2018, and entitled "CRYPTOGRAPHICALLY-SECURED, TOKEN-BASED DATA LIFECYCLE MANAGEMENT AND COMPUTER NETWORK SYSTEMS AND COMPUTER-IMPLEMENTED METHODS THEREOF," which is incorporated herein by reference in its entirety for all purposes.

FIELD OF TECHNOLOGY

The subject matter herein generally relates to database-centered computer network systems and computer-implemented methods for cryptographically-secured distributed data management.

BACKGROUND OF TECHNOLOGY

A computer network system may include a group of computer systems and other computing hardware devices that are linked together through communication channels to facilitate communication and resource-sharing among a wide range of users.

SUMMARY OF THE DISCLOSURE

In some embodiments and, optionally, in combination of any embodiment described above or below, the at least some embodiments of the present disclosure provide an exemplary system that includes at least the following components: a distributed blockchain environment, including: i) a plurality of externally owned presence (EOP) member nodes associated with a plurality of distinct entities, where each EOP member node including one or more computers associated with at least one distinct entity; ii) one or more cryptographically-secured distributed ledgers, storing a plurality of persistent data objects across the one or more computers of the EOP member nodes; iii) a plurality of electronic wallets (e-Wallets), configured to hold one or more data records of distributed leger collateral (DLC) tokens, where the computers of the EOP member are configured to administer one or more respective e-Wallets of the plurality of e-Wallets; iv) a plurality of self-contained self-executing software containers (SESCs), including: 1) one or more first-type SESCs, where each first-type SESC includes a plurality of persistent software routines configured to: a) create a plurality of persistent SESC data objects storing distinct data items of at least one transaction between a plurality of entities in the one or more cryptographically-secured distributed ledgers, where the at least one transaction involves one or more assets, and b) update the distinct data items of the at least one transaction in one or more respective persistent SESC data objects; 2) one or more second-type SESCs, where each second-type SESC includes one or more persistent task-specific software routines configured to be invoked by one or more persistent software routines of the first-type SESC to update one or more respective distinct data items of the at least one transaction based on each respective task to be performed by one or more persistent software routines of the first-type SESC with the one or more respective distinct data items; and 3) one or more third-type SESCs, where each third-type SESC includes: one or more persistent token-specific software routines configured to administer the DLC tokens within the distributed blockchain environment, where the DLC tokens are used by the distributed blockchain environment to substitute one or more first assets of at least one first party for one or more second assets of at least one second party in the at least one transaction; where the one or more first-type SESCs, the one or more second-type SESCs, and the one or more third-type SESCs are distinct SESCs; where each DLC token include at least one unique entity-identifying cryptographic hash; where, for each respective transaction associated with a respective EOP member node, the one or more computers of the respective EOP member node are configured to invoke i) the one or more first-type SESCs and ii) the one or more third-type SESCs to cryptographically administer each respective transaction within the distributed blockchain environment.

In some embodiments and, optionally, in combination of any embodiment described above or below, the at least some embodiments of the present disclosure provide and exemplary method that includes at least the steps of: administering, by one or more computers, a plurality of externally owned presence (EOP) member nodes associated with a plurality of distinct entities; administering, by the one or more computers, one or more cryptographically-secured distributed ledgers, storing a plurality of persistent data objects across an distributed blockchain environment of the EOP member nodes; administering, by the one or more computers, a plurality of electronic wallets (e-Wallets), configured to hold one or more data records of distributed leger collateral (DLC) tokens; administering, by the one or more computers, a plurality of self-contained self-executing software containers (SESCs), including: 1) one or more first-type SESCs, where each first-type SESC includes a plurality of persistent software routines configured to: a) create a plurality of persistent SESC data objects storing distinct data items of at least one transaction between a plurality of entities in the one or more cryptographically-secured distributed ledgers, where the at least one transaction involves one or more assets, and b) update the distinct data items of the at least one transaction in one or more respective persistent SESC data objects; 2) one or more second-type SESCs, where each second-type SESC includes one or more persistent task-specific software routines configured to be invoked by one or more persistent software routines of the first-type SESC to update one or more respective distinct data items of the at least one transaction based on each respective task to be performed by one or more persistent software routines of the first-type SESC with the one or more respective distinct data items; and 3) one or more third-type SESCs, where each third-type SESC includes: one or more persistent token-specific software routines configured to administer the DLC tokens within the distributed blockchain environment, where the DLC tokens are used by the distributed blockchain environment to substitute one or more first assets of at least one first party for one or more second assets of at least one second party in the at least one transaction; where the one or more first-type SESCs, the one or more second-type SESCs, and the one or more third-type SESCs are distinct SESCs; where each DLC token include at least one unique entity-identifying cryptographic hash; and administering, by the one or more computers, each respective transaction within the distributed blockchain environment in response to the one or more first-type SESCs and the one or more third-type SESCs being invoked by a respective EOP member node.

In some embodiments and, optionally, in combination of any embodiment described above or below, the one or more third-type SESCs is configured to: i) generate respective amounts of the DLC tokens respectively associated with the one or more first assets and the one or more second assets, and ii) store the respective amounts of the DLC tokens in respective eWallets of the at least one first party and the at least one second party.

In some embodiments and, optionally, in combination of any embodiment described above or below, for the at least one transaction, the plurality of persistent software routines of the one or more first-type SESCs is configured to invoke the one or more third-type SESCs to lock at least one portion of each respective amount of the DLC tokens in the respective eWallets to form respective locked DLC tokens.

In some embodiments and, optionally, in combination of any embodiment described above or below, the plurality of persistent software routines of the one or more first-type SESCs is configured to: i) invoke the one or more third-type SESCs to transfer the respective locked DLC tokens between the respective eWallets to substitute the one or more first assets of the at least one first party for the one or more second assets of the at least one second party in the at least one transaction, and ii) cryptographically record the substitution in one or more persistent SESC data objects associated with the at least one transaction.

In some embodiments and, optionally, in combination of any embodiment described above or below, the at least one transaction is an asset repurchasing transaction.

In some embodiments and, optionally, in combination of any embodiment described above or below, the one or more first assets of the at least one first party and the one or more second assets of the at least one second party are collateral assets in the asset repurchasing transaction.

In some embodiments and, optionally, in combination of any embodiment described above or below, the one or more first assets of the at least one first party and the one or more second assets of the at least one second party are assets of distinct types.

In some embodiments and, optionally, in combination of any embodiment described above or below, the one or more first assets of the at least one first party and the one or more second assets of the at least one second party are assets of distinct types.

In some embodiments and, optionally, in combination of any embodiment described above or below, the one or more first assets of the at least one first party and the one or more second assets of the at least one second party are recorded in respective hold-in-custody accounts of respective EOP member nodes.

In some embodiments and, optionally, in combination of any embodiment described above or below, the respective eWallets of the at least one first party and the at least one second party include the respective hold-in-custody accounts.

In some embodiments and, optionally, in combination of any embodiment described above or below, the one or more third-type SESCs is configured to: i) generate respective amounts of the DLC tokens respectively associated with the one or more first assets and the one or more second assets, and ii) store the respective amounts of the DLC tokens in respective eWallets of the at least one first party and the at least one second party.

In some embodiments and, optionally, in combination of any embodiment described above or below, a first eWallet of the at least one first party, a second eWallet of the at least one second party, or both store one or more respective amounts of the DLC tokens received in at least one other transaction with at least one third party.

In some embodiments and, optionally, in combination of any embodiment described above or below, the at least one third party is either the at least one first party or the at least one second party respectively when the at least one other transaction is between the at least one first party and the at least one second party.

BRIEF DESCRIPTION OF THE DRAWINGS

The present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ the present disclosure.

FIGS. 1-26 show line drawings and/or screenshots of flow diagrams and/or certain computer architectures which are representative of some exemplary aspects of the present disclosure in accordance with at least some principles of at least some embodiments of the present disclosure.

DETAILED DESCRIPTION OF THE DISCLOSURE

Figure 1:
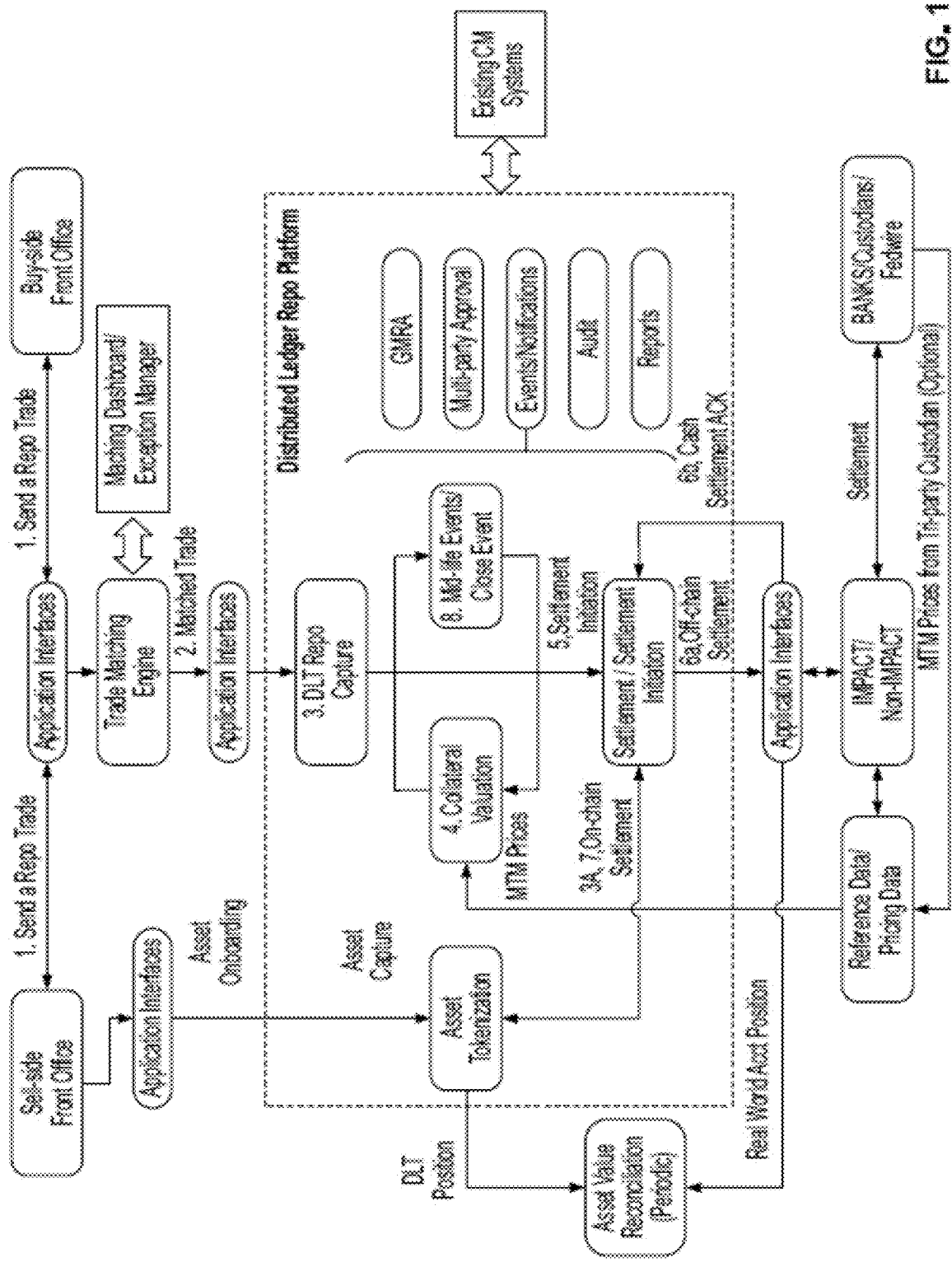

Among those benefits and improvements that have been disclosed, other objects and advantages of this disclosure can become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the disclosure may be readily combined, without departing from the scope or spirit of the disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "runtime" corresponds to any behavior that is dynamically determined during an execution of a software application or at least a portion of software application.

As used herein, the term "dynamic(ly)" means that events and/or actions can be triggered and/or occur without any human intervention. In some embodiments and, optionally, in combination of any embodiment described above or below, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments and, optionally, in combination of any embodiment described above or below, the inventive electronic systems are associated with electronic mobile devices (e.g., smartphones, etc.) of users and server(s) in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). In some embodiments and, optionally, in combination of any embodiment described above or below, a plurality of concurrent users can be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments and, optionally, in combination of any embodiment described above or below, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., Go, C++, Objective-C, Swift, Java, Javascript, Python, Perl, etc.). The aforementioned examples are, of course, illustrative and not restrictive.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments and, optionally, in combination of any embodiment described above or below, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In one example implementation, a multi-processor system may include a plurality of processor chips each of which includes at least one I/O component which is designed to directly connect to photonic components to connect to at least an I/O device. In some embodiments and, optionally, in combination of any embodiment described above or below, the I/O device may be a standard interface, such as peripheral component interconnect express (PCIe), universal serial bus (USB), Ethernet, Infiniband, and the like. In some embodiments and, optionally, in combination of any embodiment described above or below, the I/O device may include a storage device.

In one example implementation, a multi-processor system may include plurality of photonic components and an off-chip memory. The off-chip memory may be shared by more than one of the processor chips. The off-chip memory may be directly connected to a single processor chip and shared with other processor chips using a global memory architecture implemented by using a processor-to-processor approach. The multi-processor system may also include a cache and a plurality of processor chips each of which includes at least one I/O component which is designed to directly connect to the photonic components to communicate with one or more other processor chips. At least one I/O component of at least one of the processor chips may be configured to use a directory-based cache-coherence protocol. In some embodiments and, optionally, in combination of any embodiment described above or below, a cache of at least one of the processor chips may be configured to store directory information. In some embodiments and, optionally, in combination of any embodiment described above or below, the off-chip memory may include a DRAM. In some embodiments and, optionally, in combination of any embodiment described above or below, directory information may be stored in the off-chip memory and the on-chip cache of at least one of the processor chips. In some embodiments and, optionally, in combination of any embodiment described above or below, the multi-processor system may further include a directory subsystem configured to separate the off-chip memory data and the directory information on to two different off-chip memories. In some embodiments and, optionally, in combination of any embodiment described above or below, the multi-processor system may further include a directory subsystem configured with some of the subsystem implemented on a high-performance chip which is part of the 3D DRAM memory stack. In some embodiments and, optionally, in combination of any embodiment described above or below, the multi-processor system may further include a directory subsystem configured to support varying numbers of sharers per memory block. In some embodiments and, optionally, in combination of any embodiment described above or below, the multi-processor system may further include a directory subsystem configured to support varying numbers of sharers per memory block using caching. In some embodiments and, optionally, in combination of any embodiment described above or below, the multi-processor system may further include a directory subsystem configured to support varying numbers of sharers per memory block using hashing to entries with storage for different numbers of pointers to sharers. In some embodiments and, optionally, in combination of any embodiment described above or below, the multi-processor system may further include a directory subsystem configured to use hashing to reduce storage allocated to memory blocks with zero sharers.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

In some embodiments and, optionally, in combination of any embodiment described above or below, the present disclosure provides an exemplary inventive cryptographically-secured, distributed ledger (blockchain) that is configured as a cryptographically secure single source of truth and immutable records for a network of a plurality of nodes. In some embodiments and, optionally, in combination of any embodiment described above or below, the inventive cryptographically-secured, distributed ledger may be based, at least in part, on Euthereum blockchain (Ethereum Foundation, Zug, Switzerland). In some embodiments and, optionally, in combination of any embodiment described above or below, the inventive cryptographically-secured, distributed ledger may be based, at least in part, on Hyperledger technologies, such as Hyperledger Fabric (The Linux Foundation, San Francisco, CA). In some embodiments and, optionally, in combination of any embodiment described above or below, the inventive cryptographically-secured, distributed ledger may be based, at least in part, on one or more methodologies detailed in Appendix A which is hereby incorporated herein for all purposes.

In some embodiments and, optionally, in combination of any embodiment described above or below, the exemplary inventive cryptographically-secured, distributed database-centered computer system may be permissioned-based and controlled by at least one supervising authority which would have administrative read/write privileges and would be entrusted with enrolling other members. In some embodiments and, optionally, in combination of any embodiment described above or below, the exemplary inventive cryptographically-secured, permissioned, distributed database-centered computer system may be executed as a continuously evolving membership of authorized node members, referenced herein as externally owned presence nodes (EOP nodes). In some embodiments and, optionally, in combination of any embodiment described above or below, the exemplary inventive cryptographically-secured distributed database-centered computer system may be programmed/configured such that only the supervising authority would be a read/write node (i.e., the supervisory EOP member node) and other members/participants may have read-only nodes (e.g., peer EOP member nodes) and/or access the inventive distributed ledge via a specialized graphical user interface (GUI) such as but not limited to, an on-line Web GUI and/or a mobile application GUI (e.g., via peer EOP member node of another member). In some embodiments and, optionally, in combination of any embodiment described above or below, the exemplary inventive cryptographically-secured, distributed database-centered computer system may be programmed/configured to allow members/participants to setup trusted/authorized EOP nodes, utilizing one or more digital signature cryptographic algorithms such as, but not limited to, Elliptic Curve Digital Signature Algorithm (ECDSA) based on a private/public key pair. In some embodiments and, optionally, in combination of any embodiment described above or below, the private key may be stored only with the participant/member (a peer EOP member node) and the supervisory EOP member node does not have access to the private key. For example, the exemplary inventive cryptographically-secured, permissioned, distributed database-centered computer system may utilize sharding to ensure non-supervisory members may be able to view only the data they are eligible/entitled to view.

In some embodiments and, optionally, in combination of any embodiment described above or below, the managing authority is an entity that facilitates the functioning of the exemplary inventive cryptographically-secured distributed database-centered computer system by facilitating the creation of digital identity for EOP-owned participants which may access the exemplary inventive cryptographically-secured, distributed database-centered computer system via any suitable computer venues such as but not limited to, a mobile portal, an on-line/Web portal, and other similar suitable interface(s).

In some embodiments and, optionally, in combination of any embodiment described above or below, the exemplary inventive cryptographically-secured, distributed database-centered computer system may be programmed/configured to facilitate in setting up self-contained, self-executing software containers (SESCs) representing a state of a particular data. Each SESC may contain the particular data and particular independent software code (ISC) which would be executed on the particular data when particular transaction(s) (e.g., data message(s), etc.) are/is directed to particular SESC(s). In some embodiments and, optionally, in combination of any embodiment described above or below, each SESC is an Ethereum smart contract-like structure.

In some embodiments and, optionally, in combination of any embodiment described above or below, the exemplary inventive cryptographically-secured, distributed database-centered computer system may be programmed/configured so that the blockchain data residing in distributed manner across nodes and/or residing in off-the-blockchain memory storage may be read only when an exemplary inventive smart contract would be executed by the exemplary inventive cryptographically-secured, distributed database-centered computer system. For example, a particular smart contract may check the identity of the invoker and, then, may retrieve only the data that the invoker is entitled to receive so that to ensure that the data privacy and/or confidentiality would be maintained.

Illustrative Examples of Utilizing SESCs for Managing n-Lateral (e.g., Bi-Lateral) Re-Purchase Agreements (REPO)

Typically, a repurchase agreement (REPO) is a form of short-term borrowing. For example, typically, a seller sells security(ies) to a buyer (e.g., investor) for a pre-determined time (e.g., overnight) or for an open period of time, and then buys the sold security(ies) back at the end of the term or at some point during the open period term. For the party selling the security and agreeing to repurchase it in the future, it is a repo; for the party on the other end of the transaction, buying the security and agreeing to sell in the future, it is a reverse repurchase agreement. Typically, there are three types of repurchase agreements:

i) a third-party repo (in this arrangement, a clearing agent or bank conducts the transactions between the buyer and seller and protects the interests of each, by holding the securities and ensures the seller receives cash at the onset of the agreement and the buyer transfers funds for the benefit of the seller and delivers the securities at maturation);

ii) a specialized delivery repo (this arrangement requires a bond guarantee at the beginning of the agreement and upon maturity); and iii) a held-in-custody (HIC) repo (in this arrangement, the seller receives cash for the sale of the security, but holds it in a custodial account for the buyer; however, there is a risk the seller may become insolvent and the borrower may not have access to the collateral).

In some embodiments and, optionally, in combination of any embodiment described above or below, the exemplary inventive cryptographically-secured, distributed database-centered computer system may be programmed/configured to obtain inputs data (e.g., via one or more specialized APIs) regarding at least one of:

i) financial instrument trades,
ii) trade settlements,
iii) current positions (i.e., custodian current positions),
iv) securities' static prices, and
v) trading accounts.

In some embodiments and, optionally, in combination of any embodiment described above or below, the exemplary inventive cryptographically, distributed database-centered computer system may be programmed/configured to generate output data (e.g., via one or more specialized APIs) regarding at least one of:

i) trade settlements,
ii) positional, trading, and/or account reconciliations,
iii) securities' static prices.

In some embodiments and, optionally, in combination of any embodiment described above or below, the exemplary inventive cryptographically-secured, distributed database-centered computer system may be configured to make sure that, for example, there would be only a single copy of a trade stored in the blockchain. In some embodiments and, optionally, in combination of any embodiment described above or below, the exemplary inventive cryptographically-secured, distributed database-centered computer system may be configured to match trades across counterparties (based on data inputted via respective nodes) and add or associate a unique identifier to each matched pair. For example, the exemplary inventive cryptographically-secured, distributed database-centered computer system may be configured to match trades based at least in part, on pre-determined parameters and their order. For example, if a reference number is available, it might be used as the first parameter, after that, match on at least one of party identifiers, product ID, currency, trade quantity, cash amount, price, trade rate, and other similar-suitable parameters. For example, trades which would be only partial matches, the exemplary inventive cryptographically-secured, distributed database-centered computer system may be configured to subject them to a repair mechanism/methodology and then fall into the consensus/agreement process. For example, trades which could not be matched or where only one party would have submitted would be separately held and would not me stored in the exemplary inventive blockchain.

In some embodiments and, optionally, in combination of any embodiment described above or below, the exemplary inventive cryptographically-secured, distributed database-centered computer system may be configured to be associated with a respectively digital Wallet-like application/structure which may be programmed to store a running cash balance and provide for cash movements to be passed through to respective API interfaces to respective systems (e.g., member nodes' systems).

In some embodiments and, optionally, in combination of any embodiment described above or below, the exemplary inventive cryptographically-secured, distributed database-centered computer system may be configured to reconcile the hold-in-custody (HIC) account positions against the custodian API query result(s) for respective account(s).

In some embodiments and, optionally, in combination of any embodiment described above or below, the exemplary inventive cryptographically-secured, distributed database-centered computer system may be configured to tokenize assets in a separate account. In some embodiments and, optionally, in combination of any embodiment described above or below, the exemplary inventive cryptographically-secured, distributed database-centered computer system may be configured to allow custodians (e.g., a third-party bank, etc.) to access/view its client's trades, positions, and/or the HIC account activity. In some embodiments and, optionally, in combination of any embodiment described above or below, the exemplary inventive cryptographically-secured, distributed database-centered computer system may be configured to allow a movement to the HIC account and trading of the asset tokens. In some embodiments and, optionally, in combination of any embodiment described above or below, the exemplary inventive cryptographically-secured, distributed database-centered computer system may be configured to reconcile an on-chain account against a custodian position to ensure that asset(s) is/are present.

In some embodiments and, optionally, in combination of any embodiment described above or below, the exemplary inventive cryptographically-secured, distributed database-centered computer system may be configured to reduce transaction costs due to immobilization of collateral, both between counterparties and internal movements. In some embodiments and, optionally, in combination of any embodiment described above or below, the exemplary inventive cryptographically-secured, distributed database-centered computer system may be configured to reduce failed matches by storing each trade and all related approvals/data. In some embodiments and, optionally, in combination of any embodiment described above or below, the exemplary inventive cryptographically-secured, distributed database-centered computer system may be configured to reduce computer processing time required to record, track and reconcile repo transactions. For example, data management of repo transaction via the exemplary innovative blockchain-based methodologies of the present disclosure related in minimizing memory resource that computers need to allocate for storing and/or management each repo transaction.

In some embodiments and, optionally, in combination of any embodiment described above or below, the exemplary inventive cryptographically-secured, distributed database-centered computer system may be configured to immobilize collateral by executing one or more of the following instructions:

i) allowing arties to agree that collateral will remain "in custody" or "segregated" at a current custodian location (e.g., borrower's electronic books/records) (HIC account(s));

2) setting up the custodian as a member node of the network and move the collateral via the blockchain; and 3) setting a repo-specific account at the custodian electronic system.

FIG. 1 shows an illustrative example of a flow chart in accordance with which the exemplary inventive cryptographically-secured, distributed database-centered computer system may be configured in accordance with one or more principles detailed herein. In some embodiments and, optionally, in combination of any embodiment described above or below, the exemplary inventive cryptographically-secured, distributed database-centered computer system may be programmed as a distributed ledger platform with modular components for identity management, smart contracts, endorsements, managing state database, and the distributed ledger (blockchain). In some embodiments and, optionally, in combination of any embodiment described above or below, the exemplary inventive network of nodes managed by the exemplary cryptographically-secured, distributed database-centered computer system may include at least one Endorsing Node that is configured to validate the transactions and endorse them for further processing. In some embodiments and, optionally, in combination of any embodiment described above or below, the exemplary inventive network of nodes managed by the exemplary cryptographically-secured, distributed database-centered computer system may include at least one Orderer node that orders transactions in the network and generates blocks. In some embodiments and, optionally, in combination of any embodiment described above or below, the exemplary inventive network of nodes managed by the exemplary cryptographically-secured, distributed database-centered computer system may include at least one default Certificate Authority (CA) component/node that issues, for example, but not limited to, PKI-based certificates to network members and their users. In some embodiments and, optionally, in combination of any embodiment described above or below, the exemplary inventive network of nodes managed by the exemplary cryptographically-secured, distributed database-centered computer system may include software (e.g., Chaincode) that runs on the inventive distributed ledger and is configured to encode assets and transaction instructions for modifying the assets. In some embodiments and, optionally, in combination of any embodiment described above or below, the exemplary inventive network of nodes managed by the exemplary cryptographically-secured, distributed database-centered computer system may include one or more channels that may be private or global blockchains which allows for data isolation and confidentiality. In some embodiments and, optionally, in combination of any embodiment described above or below, the exemplary inventive network of nodes managed by the exemplary cryptographically-secured, distributed database-centered computer system may include SESCs (e.g., specifically modified chaincode functions that are configured to capture transaction proposals, which then pass through a modular flow of endorsement, ordering, validation, committal, and others.

Figure 2:
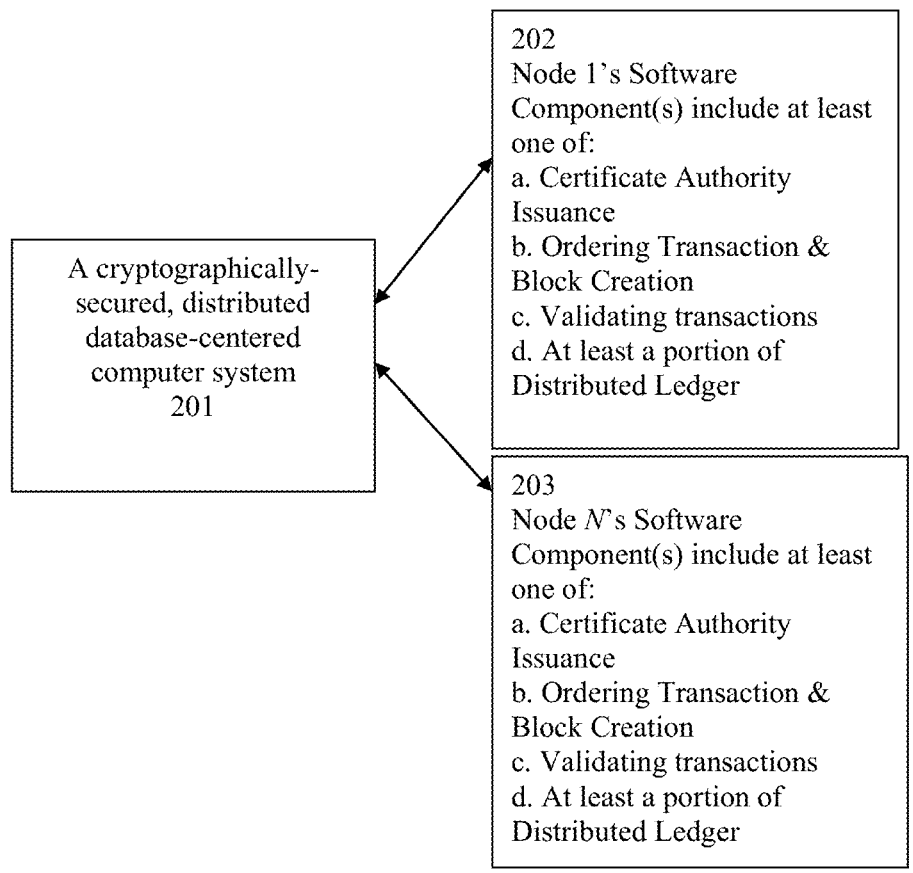

FIG. 2 shows an illustrative example of an exemplary inventive network topology with the exemplary inventive cryptographically-secured, distributed database-centered computer system (201) managing the network of exemplary nodes (202 and 203) in accordance with one or more principles detailed herein.

Figure 3:
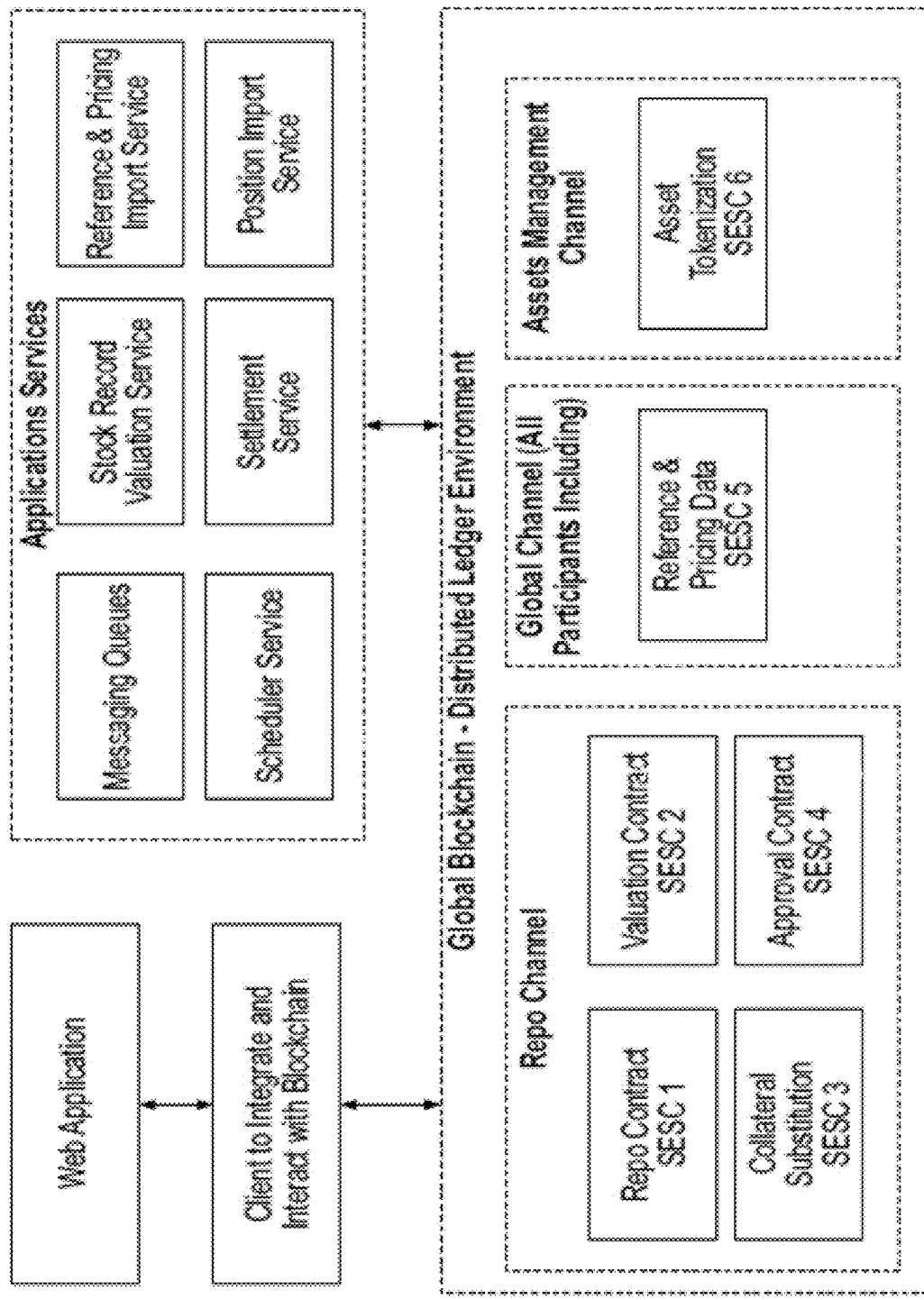

FIG. 3 shows another illustrative example of an exemplary inventive network topology with the exemplary inventive cryptographically-secured, distributed database-centered computer system having one or more channels that are private or global blockchains administered utilizing smart contracts (SESC1-6) in accordance with one or more principles detailed herein. For example, the exemplary inventive cryptographically-secured, distributed database-centered computer system can be configured so that each private channel can only communicate and maintain the distributed ledger data pertaining to one or more particular participants. For example, particular portion of the distributed ledger data may reside on corresponding node(s) of particular participant(s) that would participate in particular repo transaction(s). In some embodiments and, optionally, in combination of any embodiment described above or below, the privacy control may be configured so that permissions may be enforced on the smallest portion (unit) of the distributed ledger data.

Figure 4:
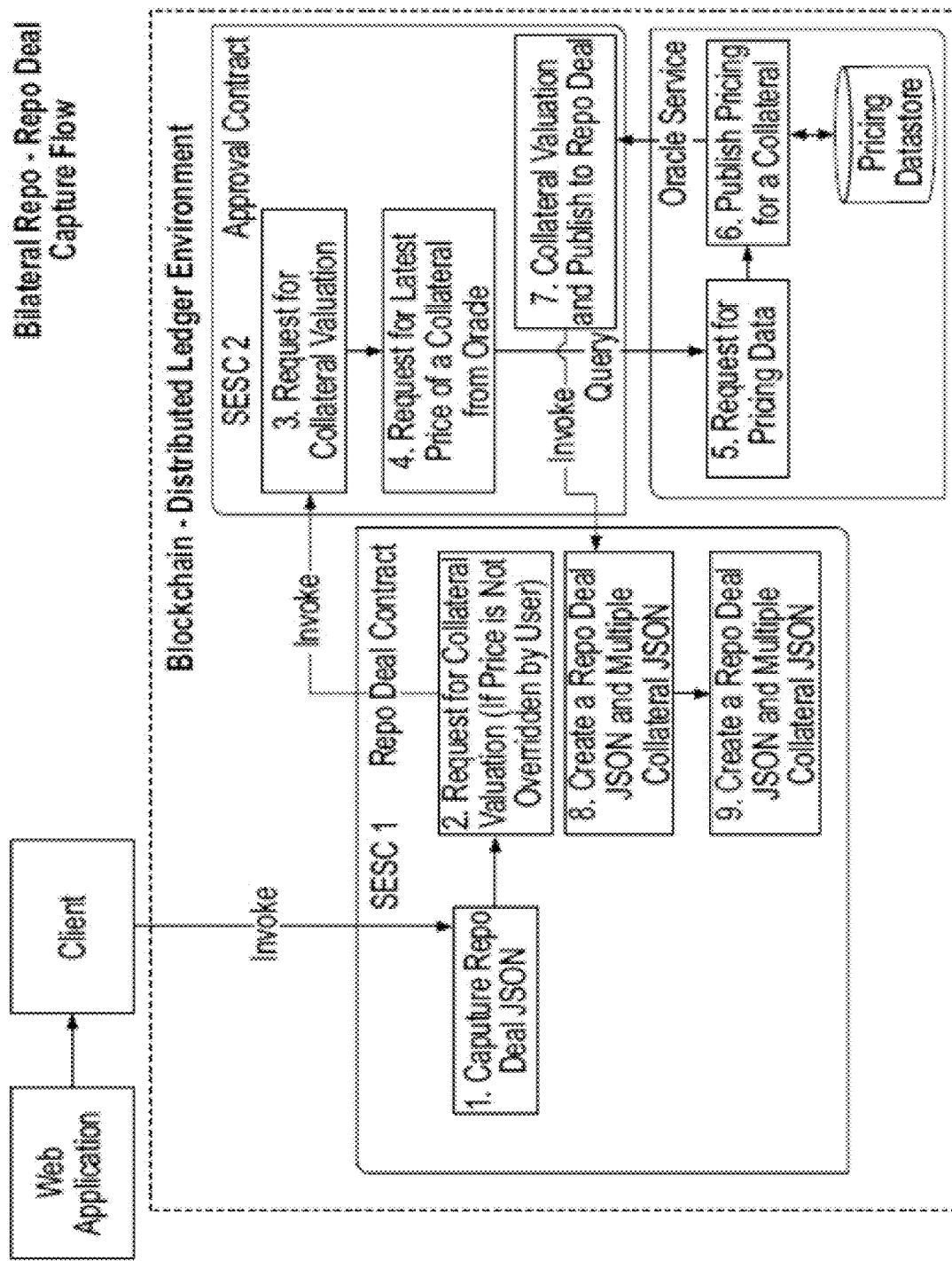

FIG. 4 shows an illustrative example of a workflow to capture in the exemplary inventive distributed ledger a bilateral repo.

Figure 5:
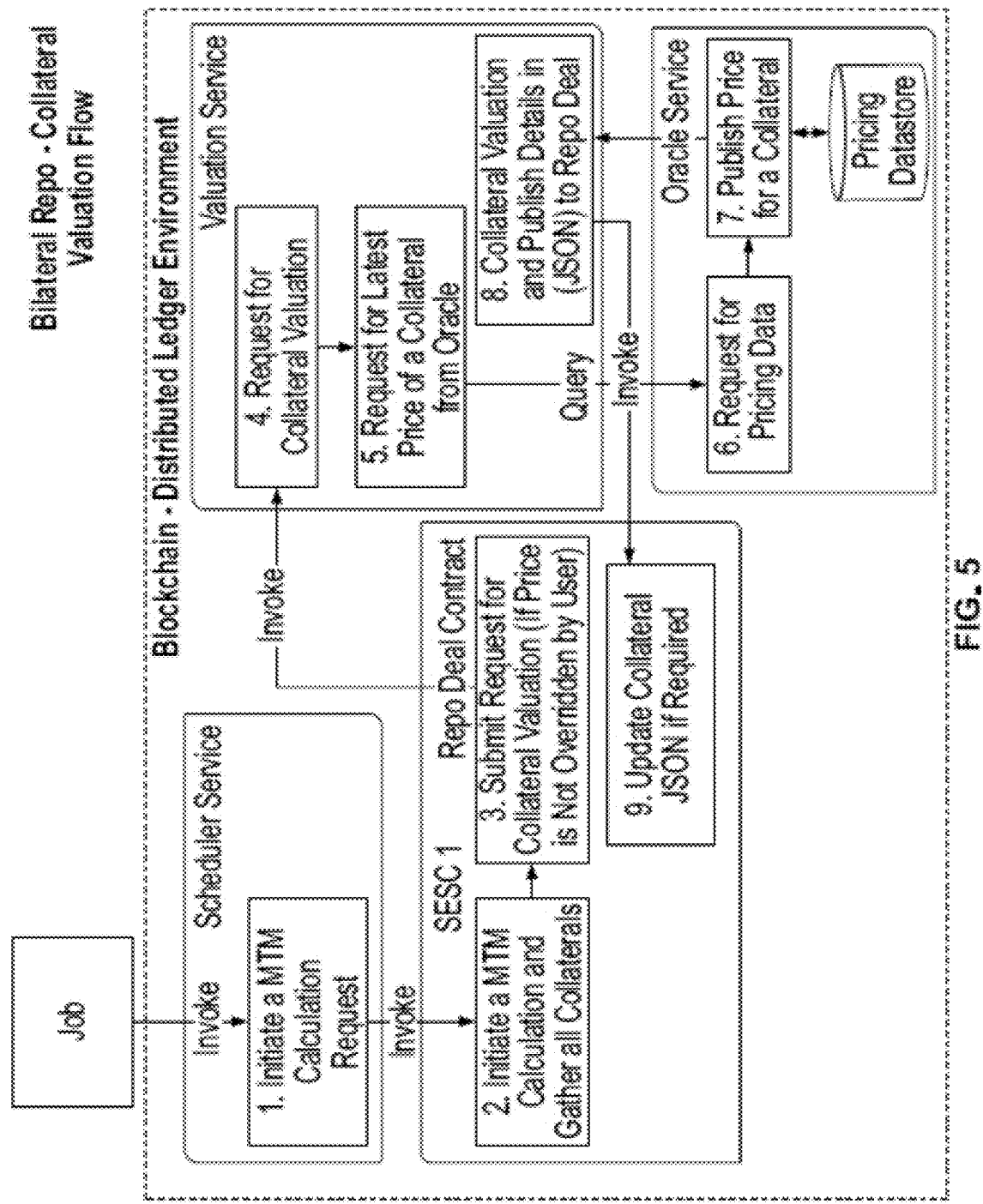

FIG. 5 shows an illustrative example of a workflow to valuate a collateral. FIG. 5 shows that such evaluation can be invoke by way of a pre-scheduled Cron job that may be set to run periodically at fixed times, dates, and/or intervals. FIG. 5 shows that a Repo Deal smart contract (SESC1) is programmed to invoke a valuation service that returns the collateral market value based on market-to-market (MTM) calculation.

Figure 6:
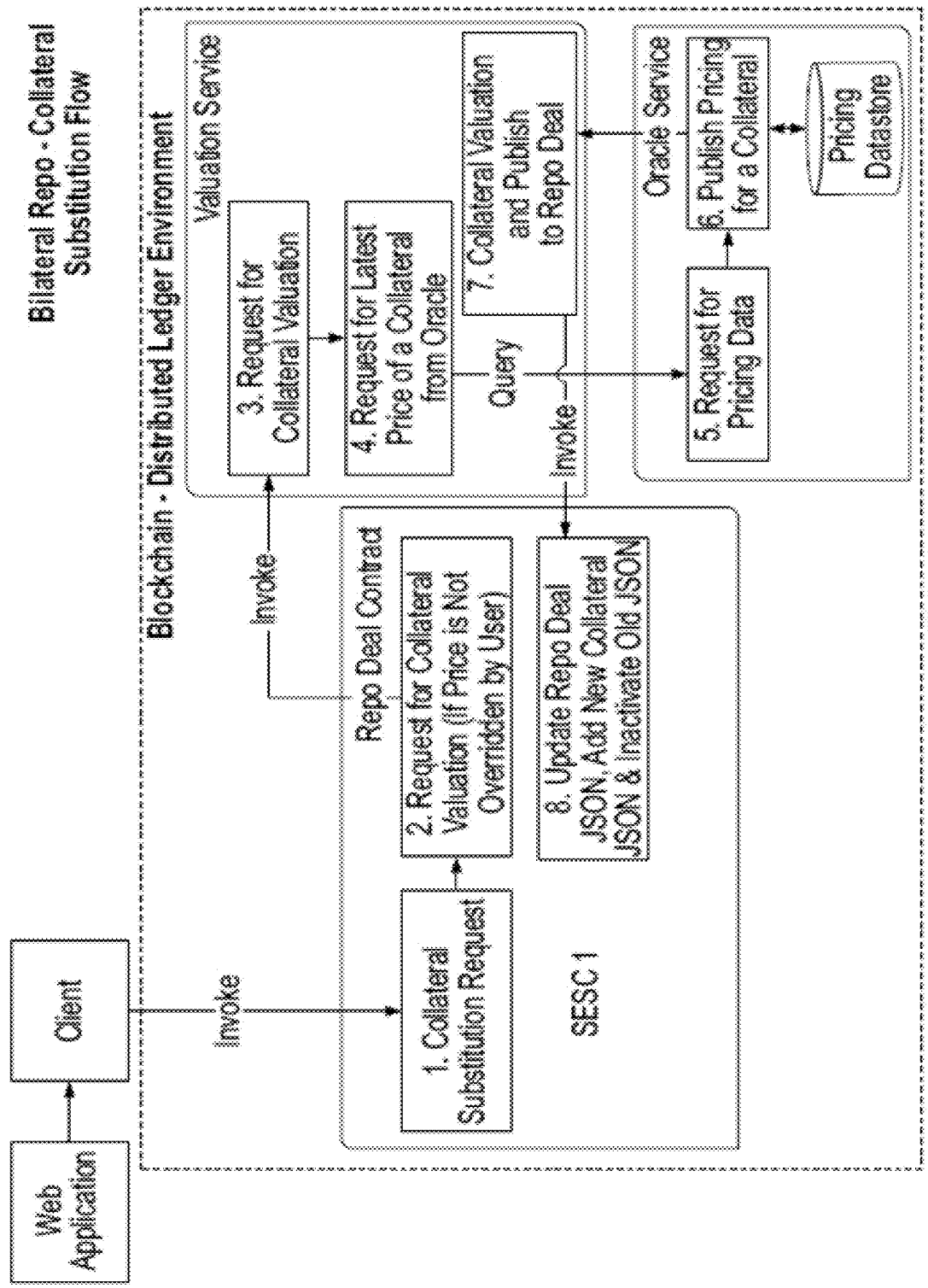

FIG. 6 shows an illustrative example of a workflow to substitute collaterals.

Figure 7:
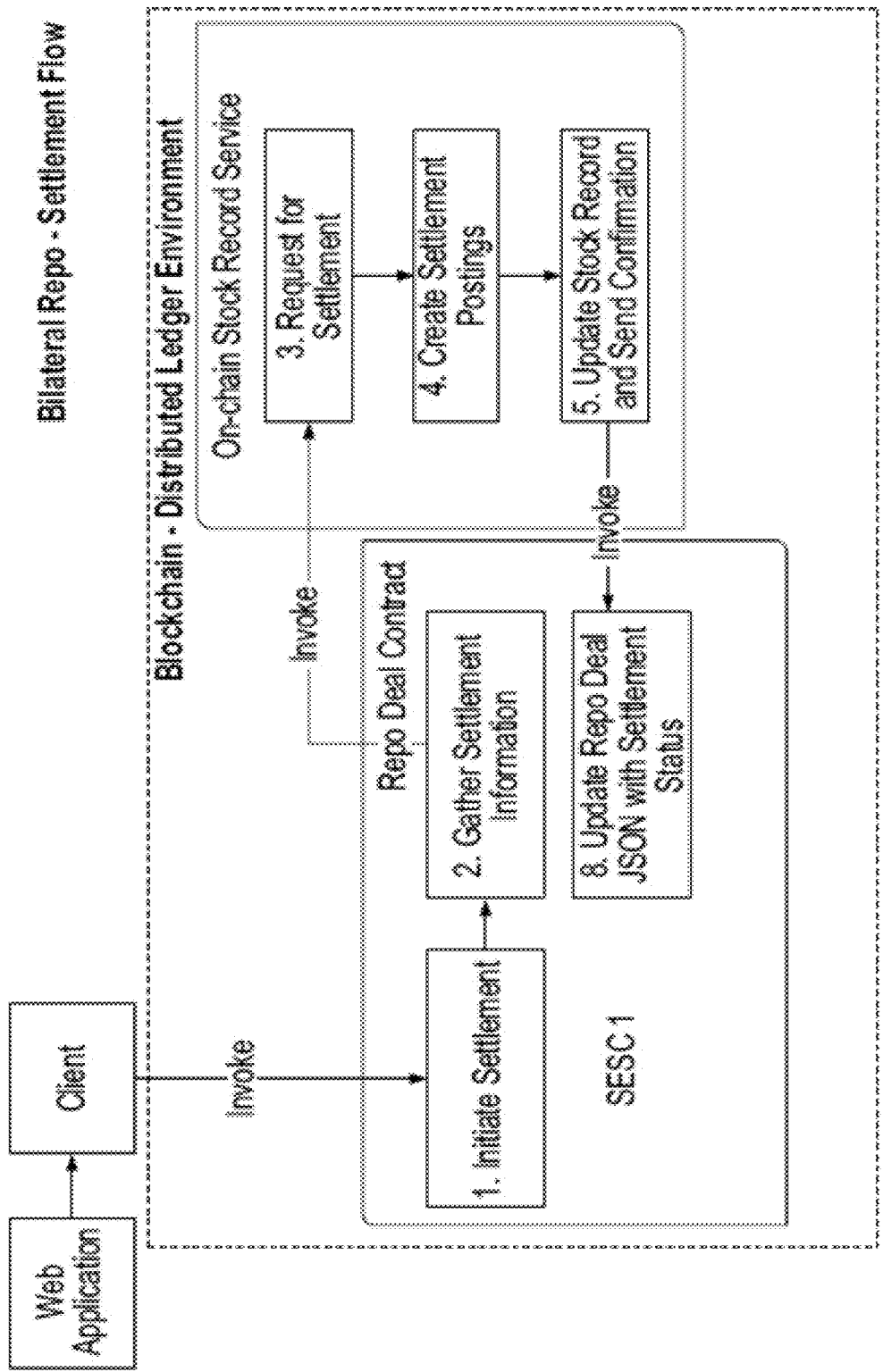

FIG. 7 shows an illustrative example of a workflow to settle an exemplary repo.

As detailed herein, SESCs that may be programmed to track and execute both legs of a non-cleared bilateral repurchase transaction (repo transaction). For example, a particular EOP node participant (who may be, but not limited to, a party to an exemplary repo transaction and/or a custodian of security(ies) being pledged as collateral) may set-up a corresponding SESC to crypto-securely capture at least the following data: terms, trade, asset substitution(s) and/or a return of collateral.

As detailed herein, all SESCs (e.g., in the form of the smart contracts) may be configured to perform specific function(s) such as, but not limited to, capturing a current state of data object(s), store the current state, and/or maintain an audit trail of previous states. In some embodiments and, optionally, in combination of any embodiment described above or below, all SESCs may be configured to communicate with each other to update and/or query state. For example, as detailed herein, the "Repo Master Agreement" SESC may be configured to acquire data regarding terms and conditions and/or parameterize attributes of each arrangement between a borrower and a lender. For example, as detailed herein, the "Repo" SESC may be configured to track lifecycle of the repo trade by performing activities such as, but not limited to, capturing of trade details, enriching attributes (amounts), maintaining statuses, and/or generating settlement instructions for settlement processing. For example, as detailed herein, the "Multi-party approval" SESC may be configured to implement an approval process, by for example, preventing a repo contract to be recorded on the inventive blockchain distributed ledger until and unless both parties agree. For example, as detailed herein, the "Collateral Valuation" SESC may be configured to value all collateral with latest prices, by, for example, but not limited to, accessing the latest prices from one or more designated electronic sources (e.g., stock exchange, etc.).

Illustrative Examples of Utilizing Inventive Tokens in Managing n-Lateral Repos

In some embodiments and, optionally, in combination of any embodiment described above or below, the exemplary cryptographically-secured, distributed database-centered computer system may be configured to utilize Distributed Ledger Collateral Tokens (DLC Tokens) in its operation. In some embodiments and, optionally, in combination of any embodiment described above or below, the exemplary cryptographically-secured, distributed database-centered computer system may be configured to generate DLC Tokens. In some embodiments and, optionally, in combination of any embodiment described above or below, DLC Tokens may be issued by a designated issuing authority. In some embodiments and, optionally, in combination of any embodiment described above or below, corresponding DLC Token(s) may be issued when particular real-world position(s) is/are locked-in by a participant (e.g., custodian). In some embodiments and, optionally, in combination of any embodiment described above or below, the inventive description herein references an account with all real-world locked-in position(s) as a Segregated Custody account (Lock-up account). In some embodiments and, optionally, in combination of any embodiment described above or below, the inventive description references a process of Token Issue as the process when DLC Token(s) is/are created along with corresponding locked position(s). In some embodiments and, optionally, in combination of any embodiment described above or below, the inventive description references a process of Token Withdrawal as the process when DLC Token(s) is/are withdrawn with current owned position(s) from the exemplary inventive blockchain distributed ledger, resulting in an unlocking of a position in the Lock-up account. In some embodiments and, optionally, in combination of any embodiment described above or below, the inventive description references a process of token rehypothecation as the process when one or more participants could lend borrowed DLC token(s) to other participants. In some embodiments and, optionally, in combination of any embodiment described above or below, the locking of positions and the issuance of DLC tokens can with or without token rehypothecation.

Figure 8:
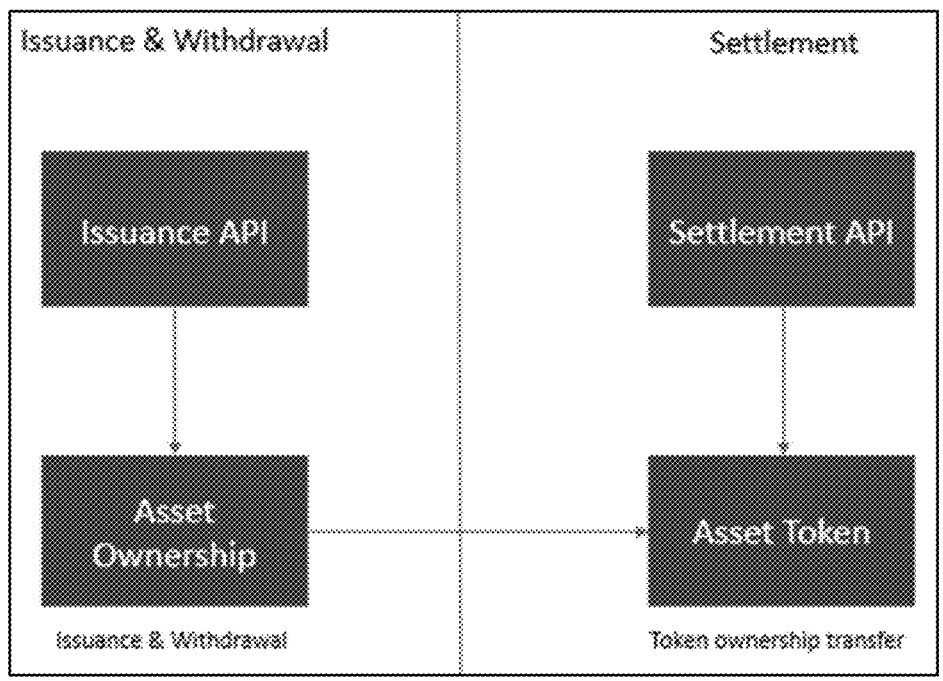

FIG. 8 shows an illustrative example of a workflow for the issuance and settlement of the DLC tokens.

Figure 9:
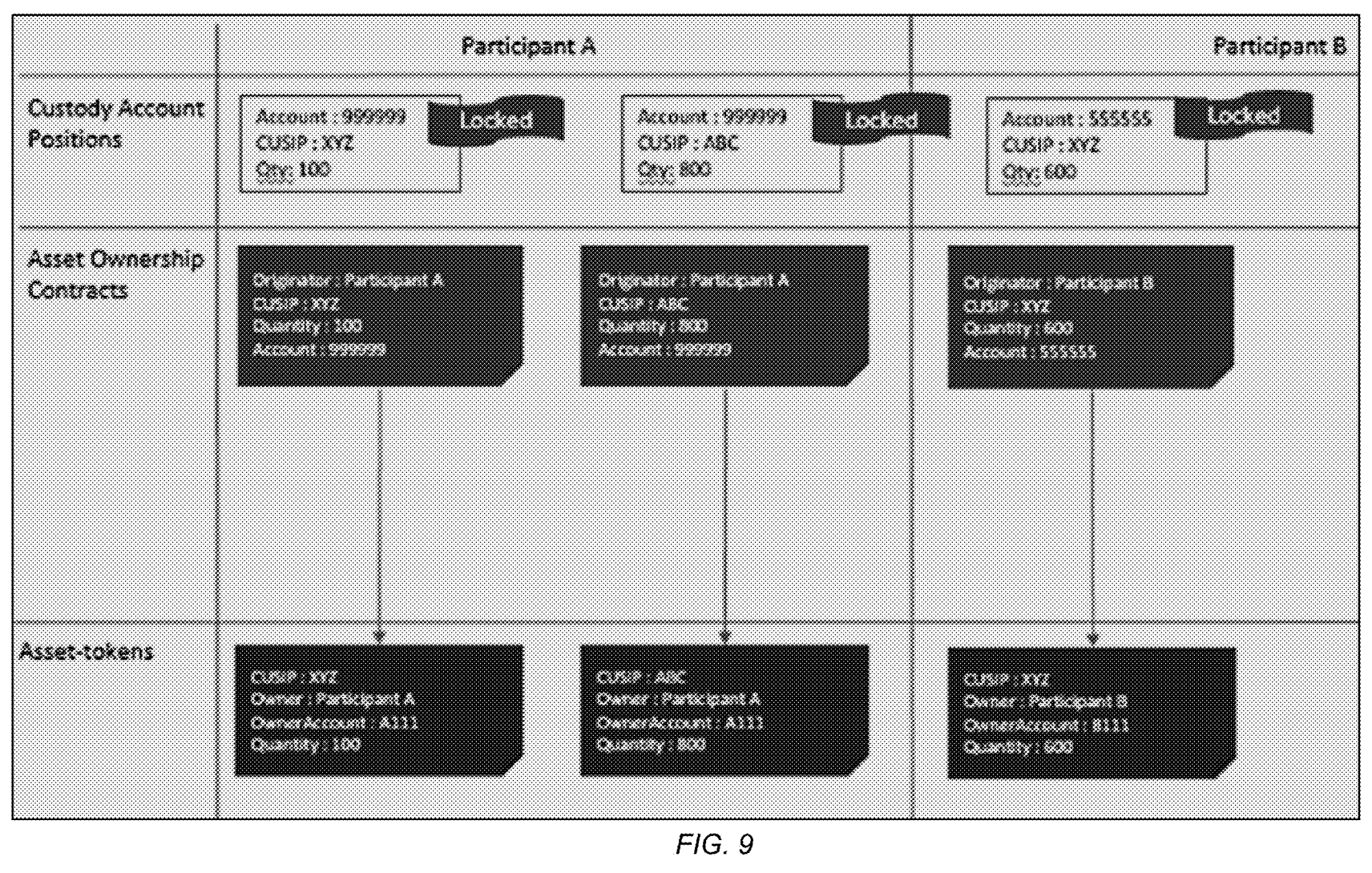

FIG. 9 shows an illustrative example of the inventive management of digital assets and DLC tokens issuance.

Figure 10:
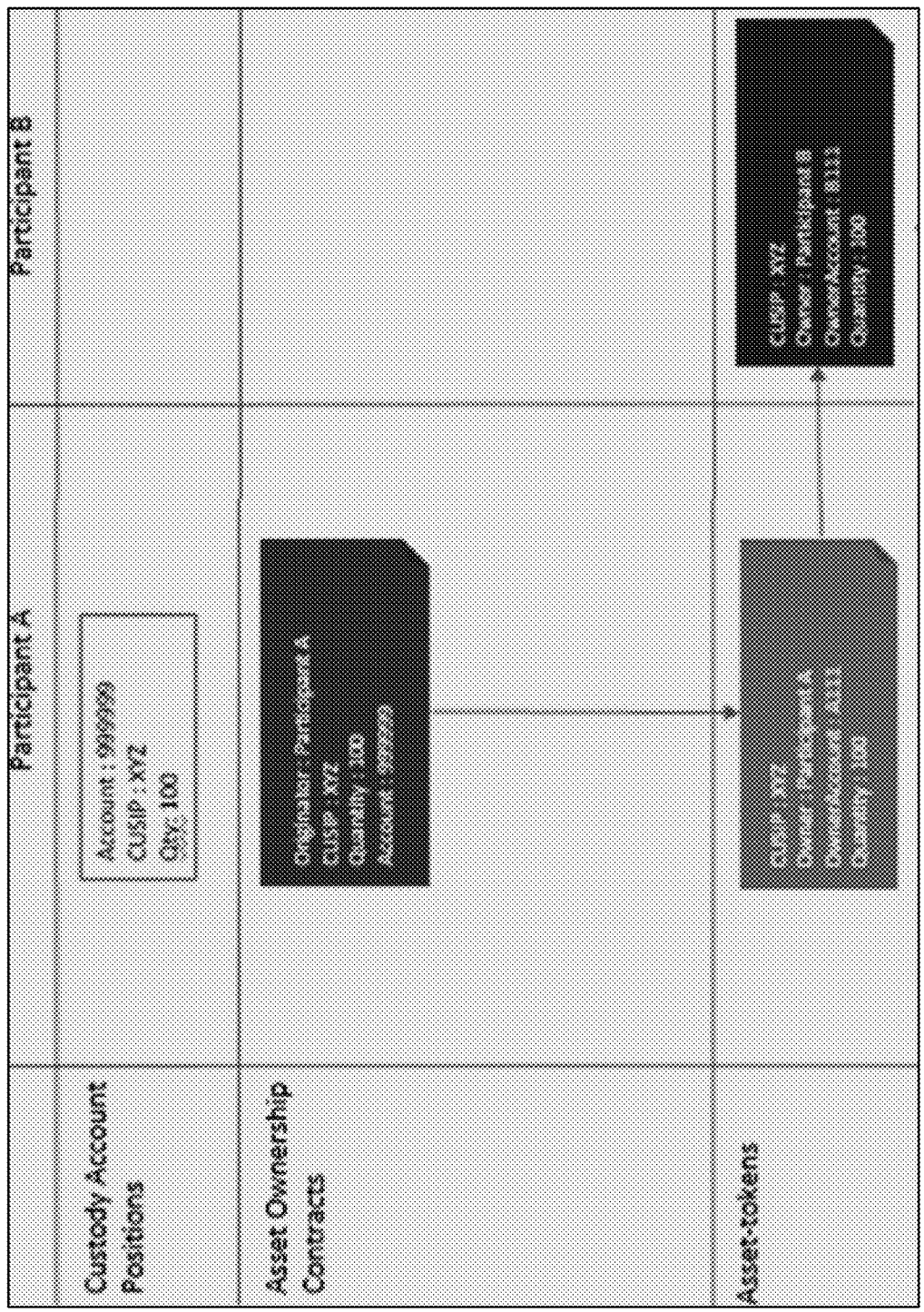

FIG. 10 shows an illustrative example of the inventive token ownership transfer.

Figure 11:
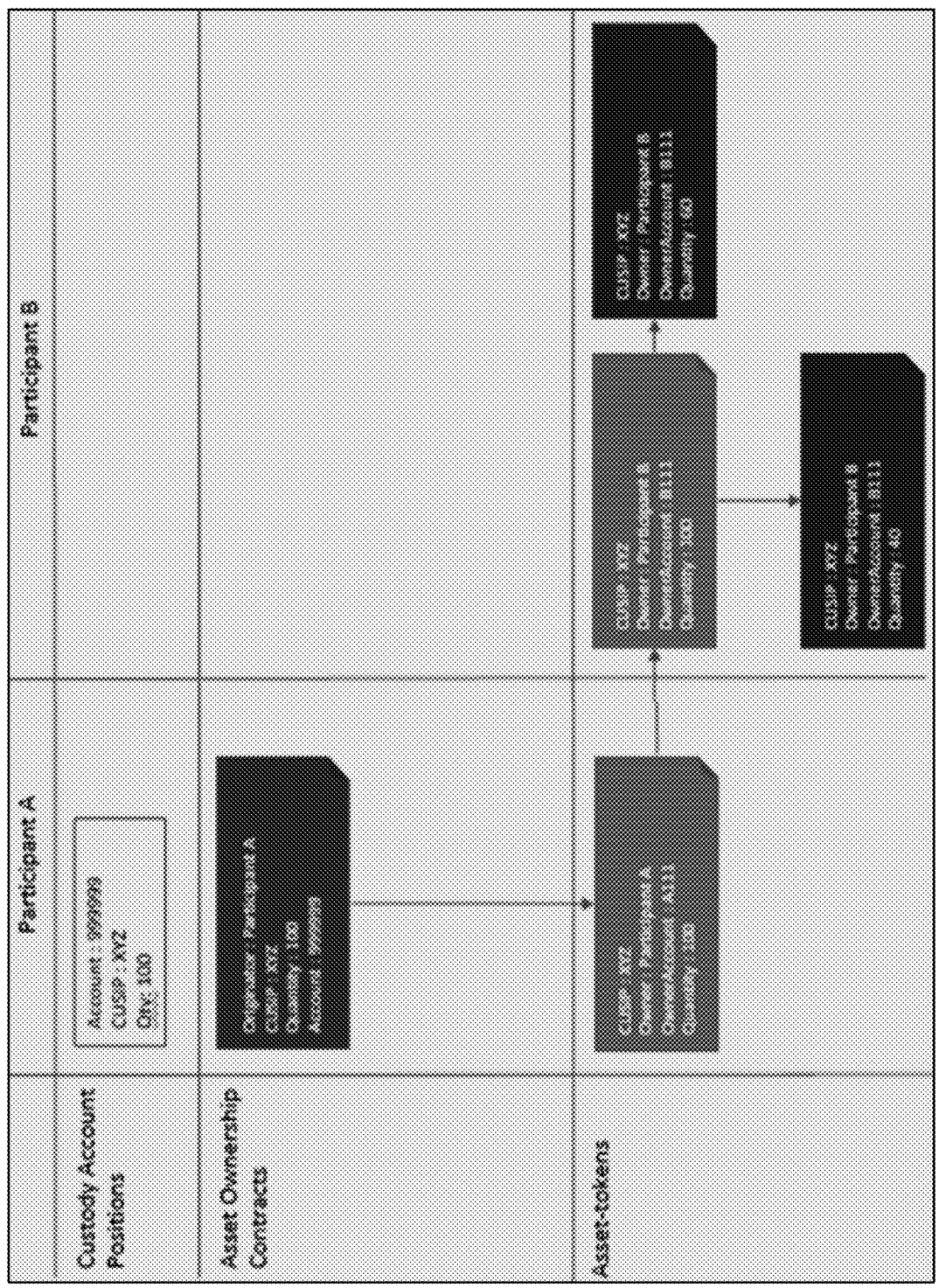

FIG. 11 shows an illustrative example of the inventive token split.

Figure 12:
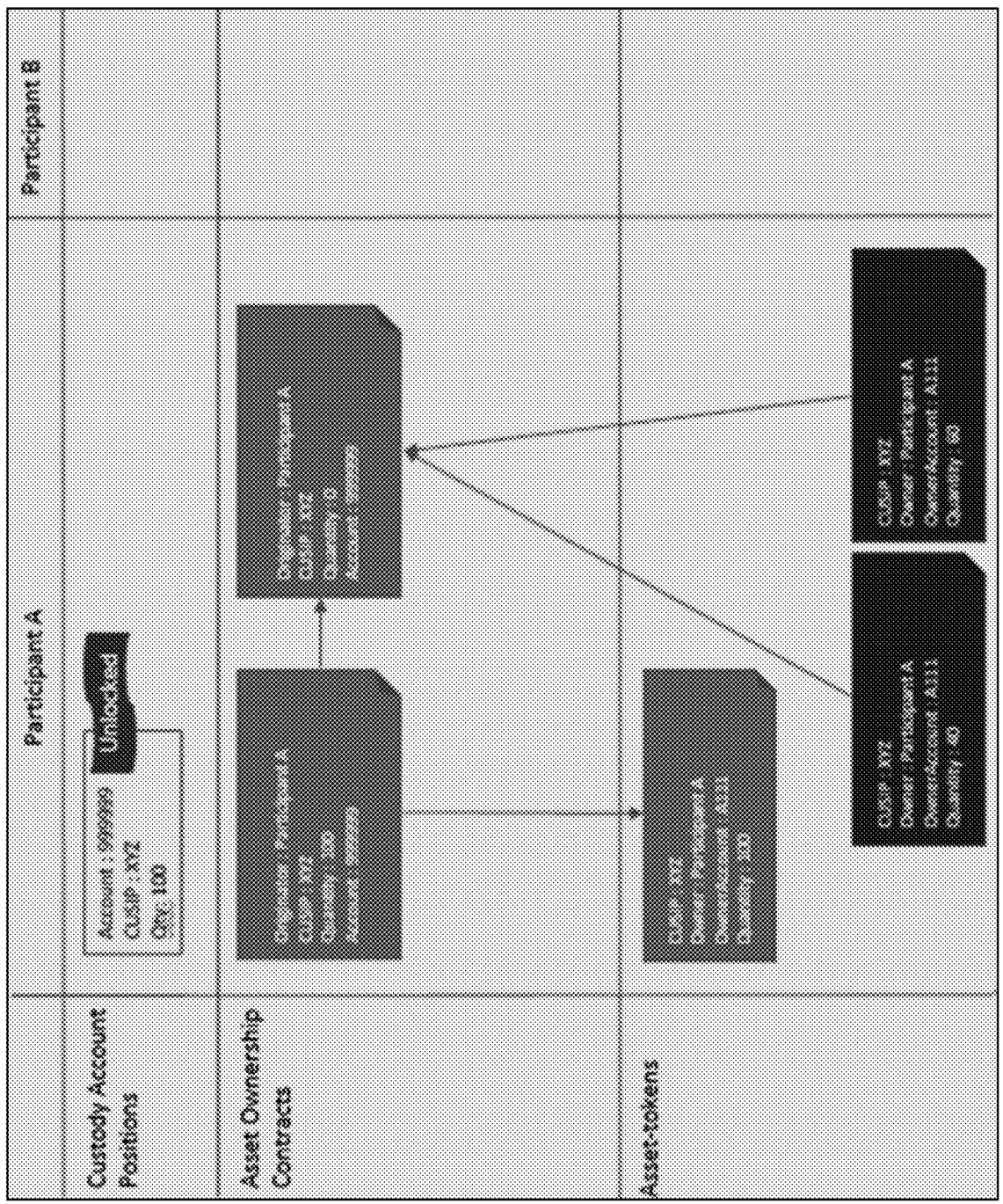
Figure 13:
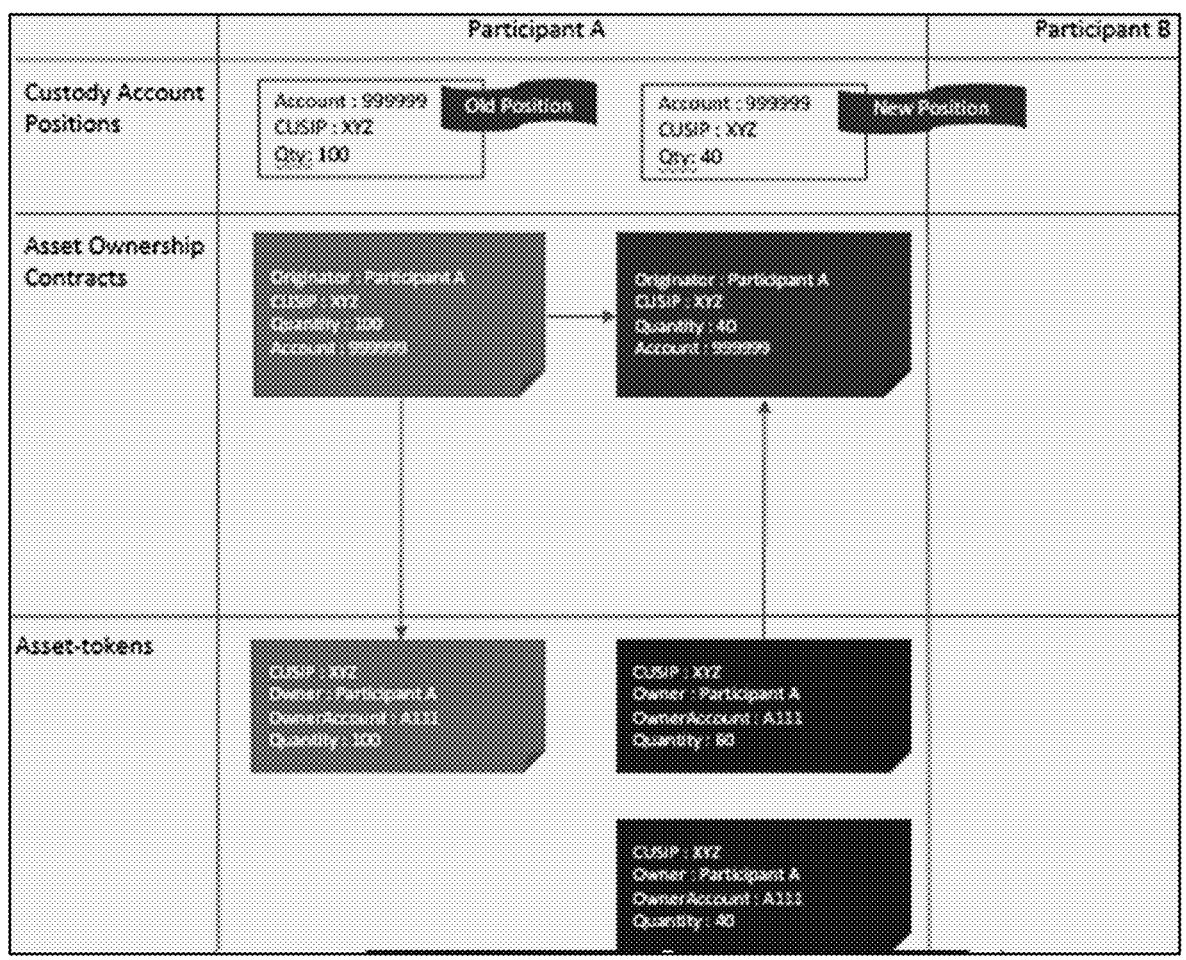
Figure 16:
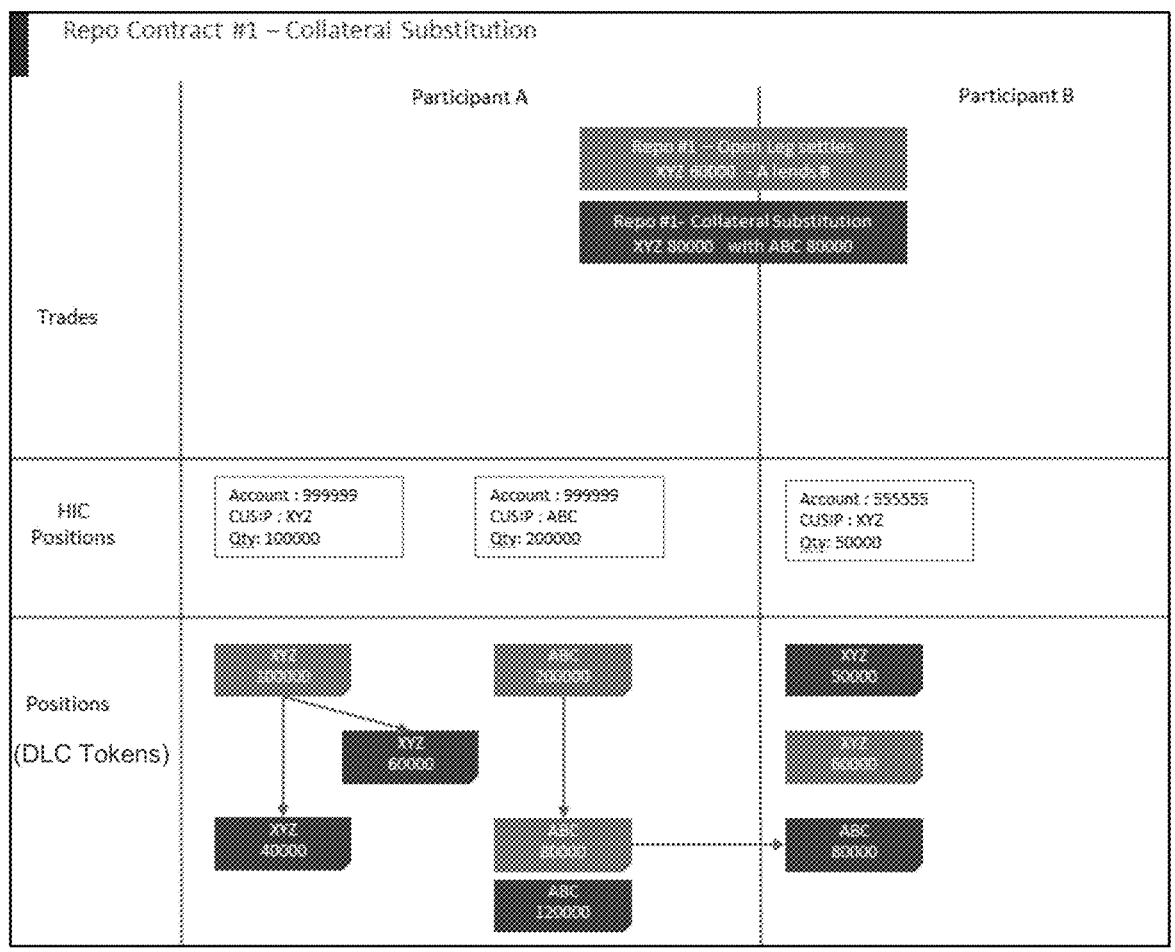
Figure 17:
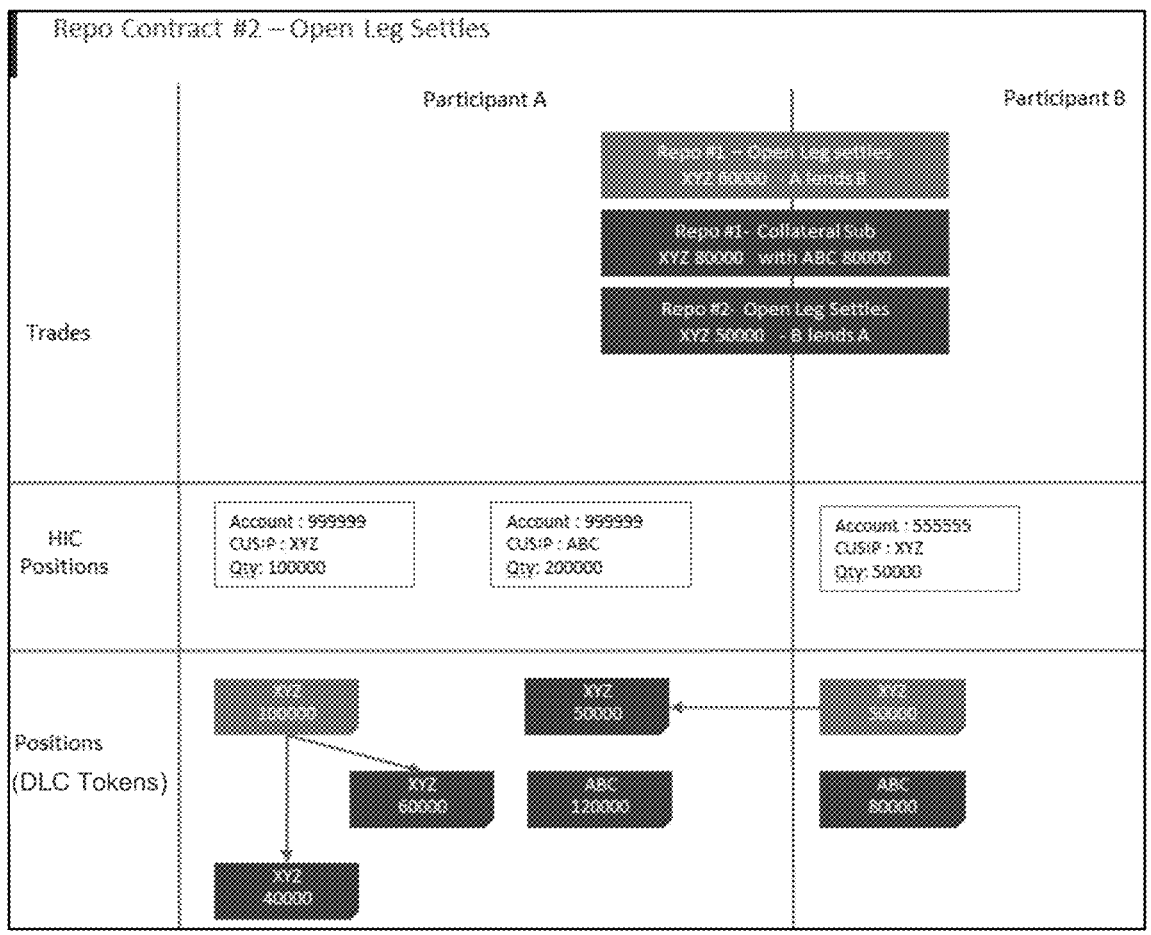
Figure 18:
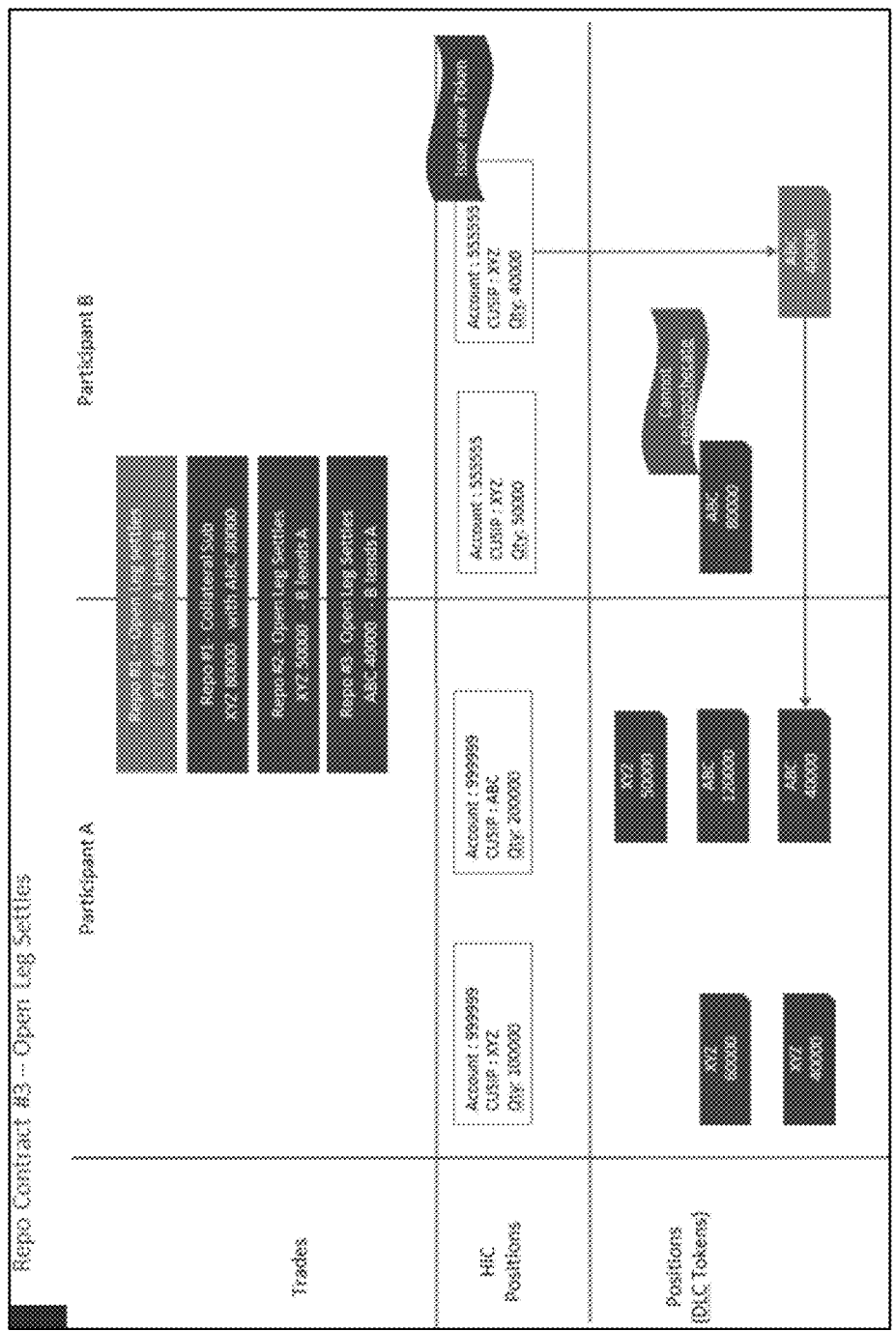
Figure 19:
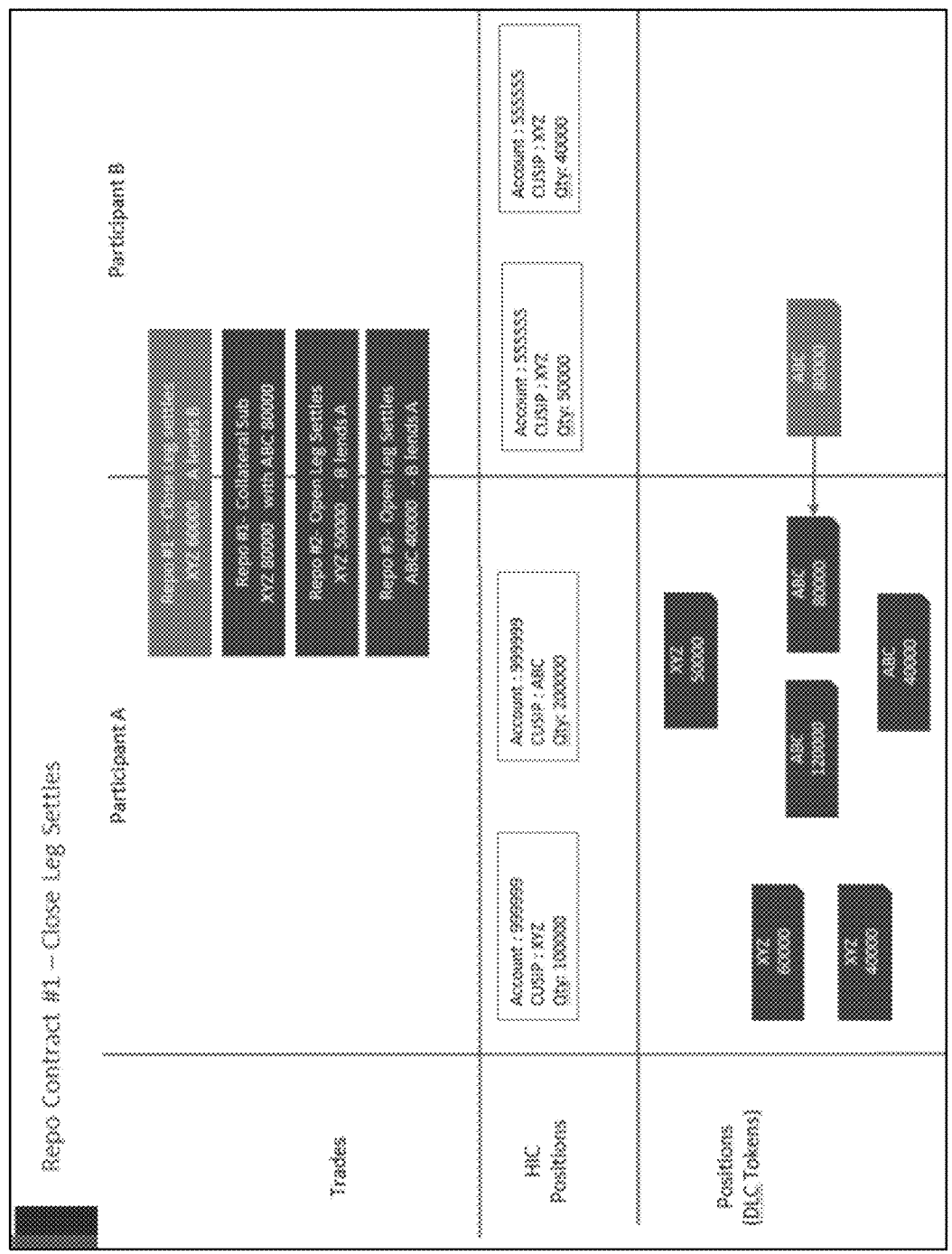
Figure 20:
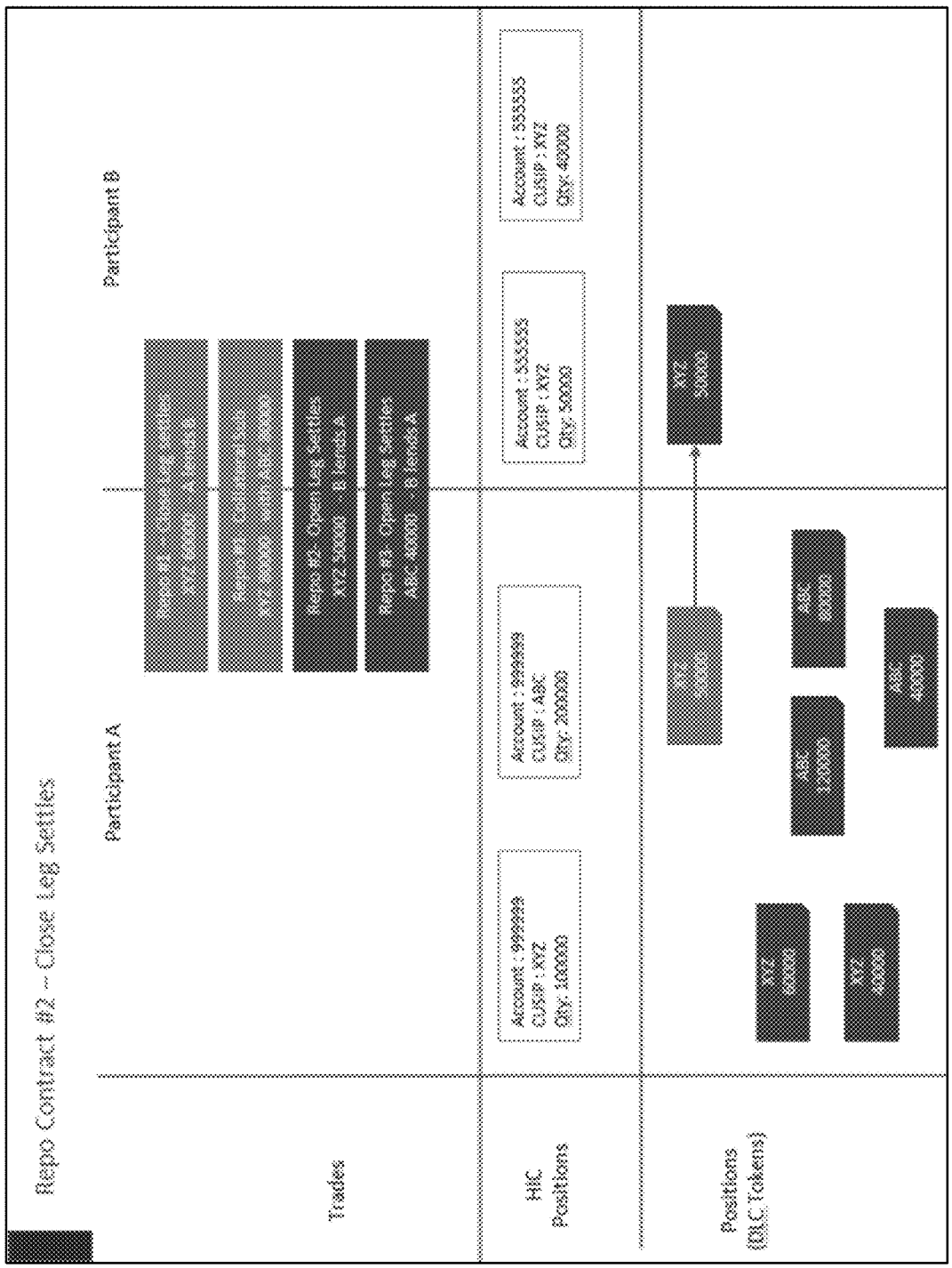
Figure 21:
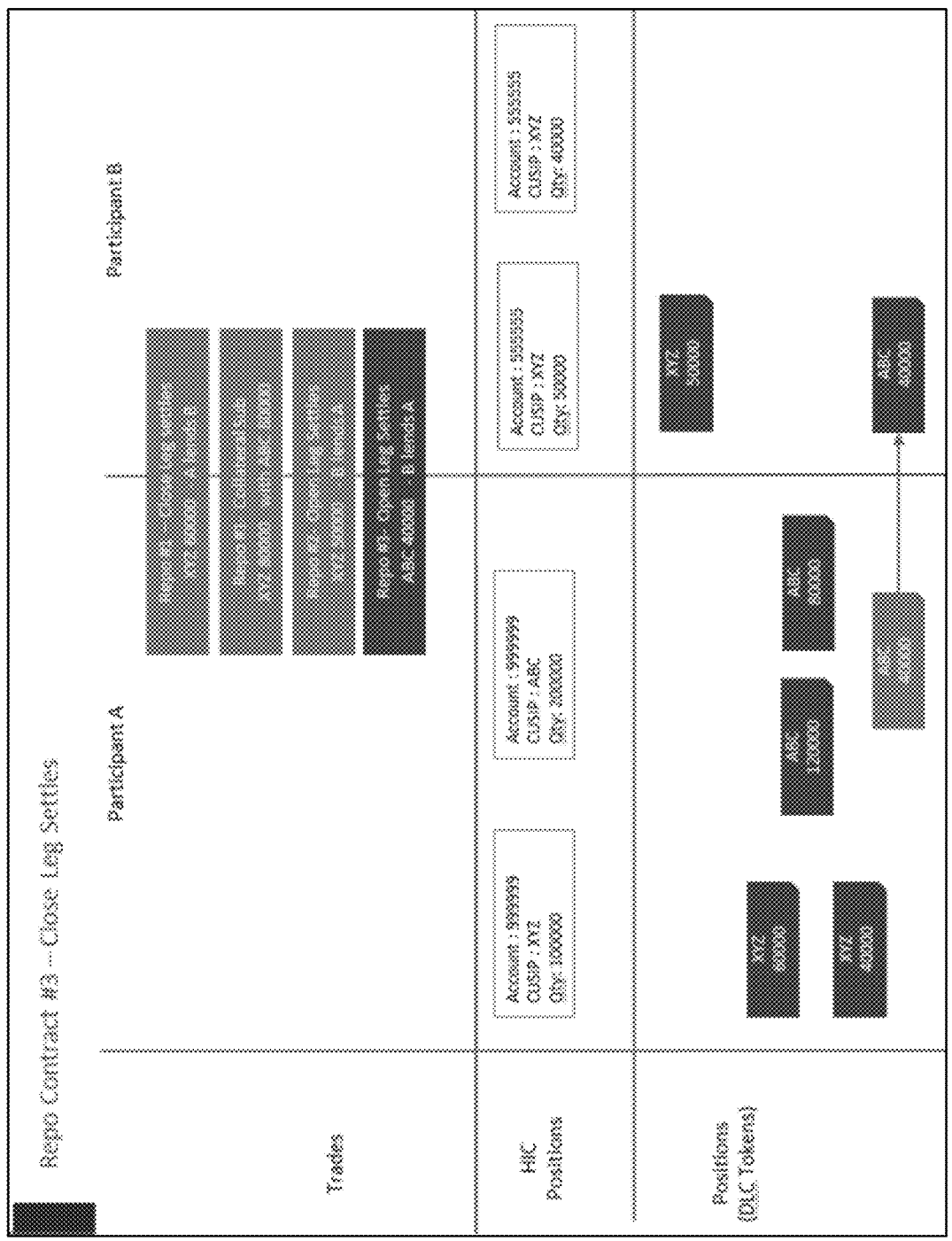
Figure 22:
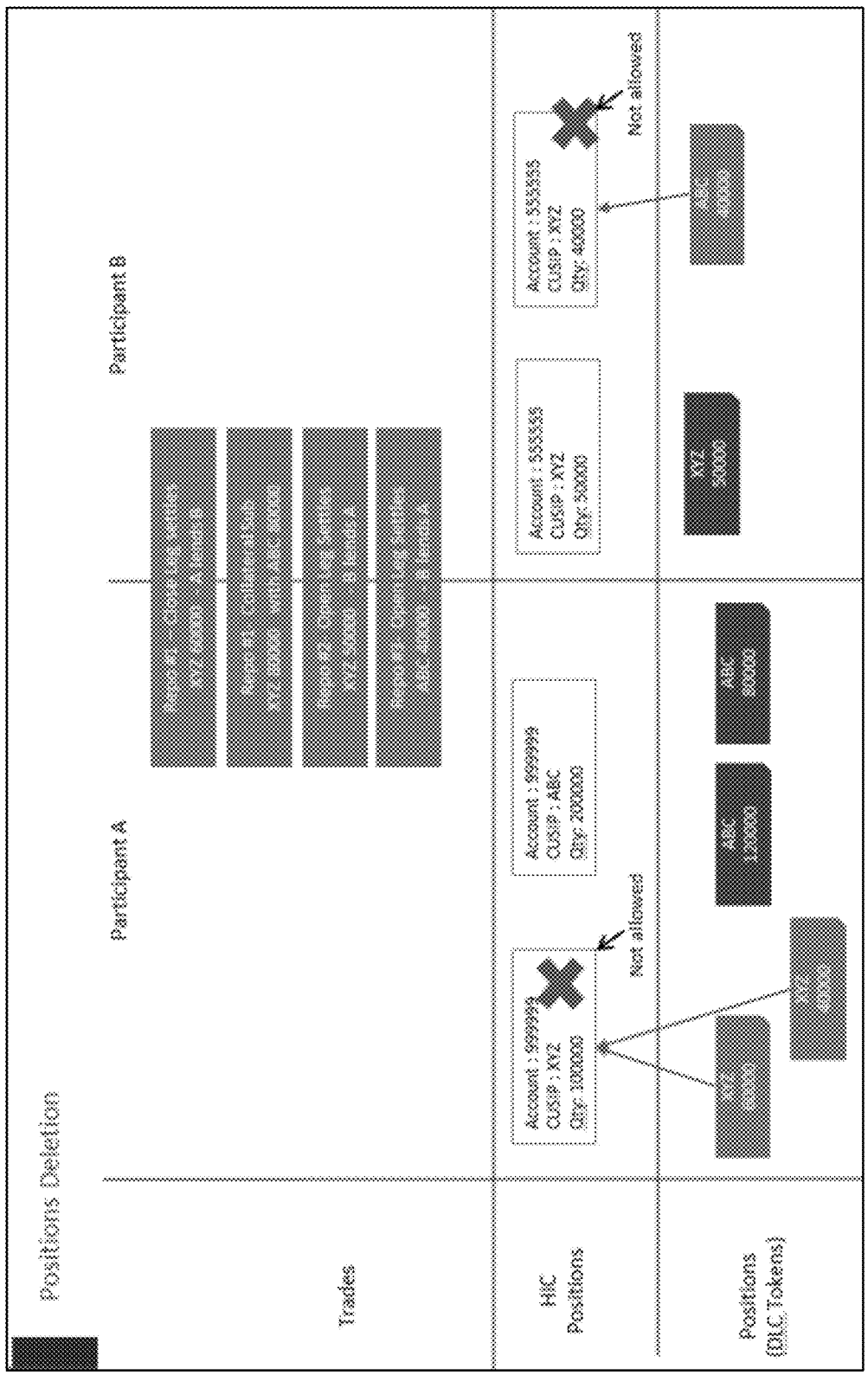
Figure 23:
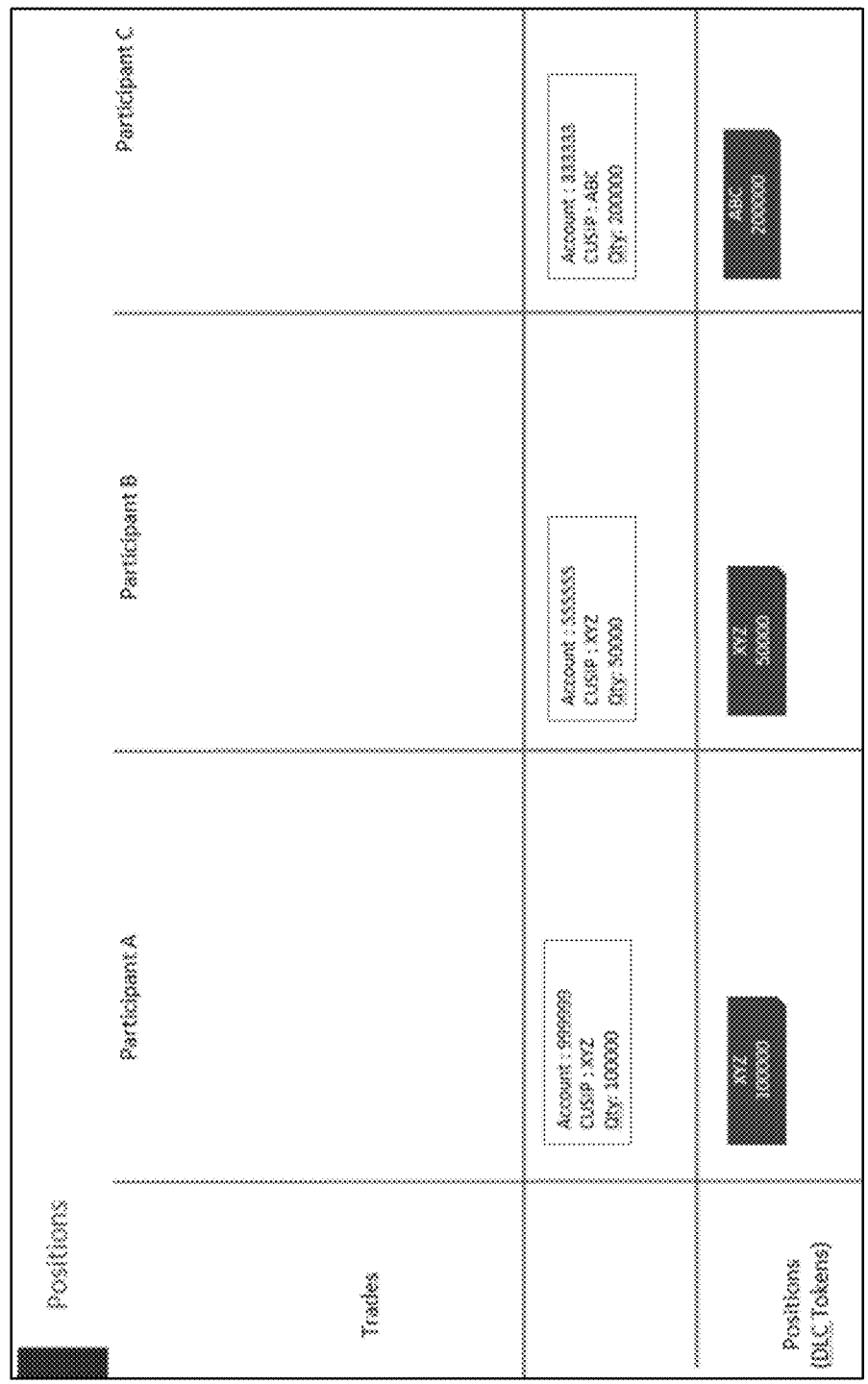
Figure 24:
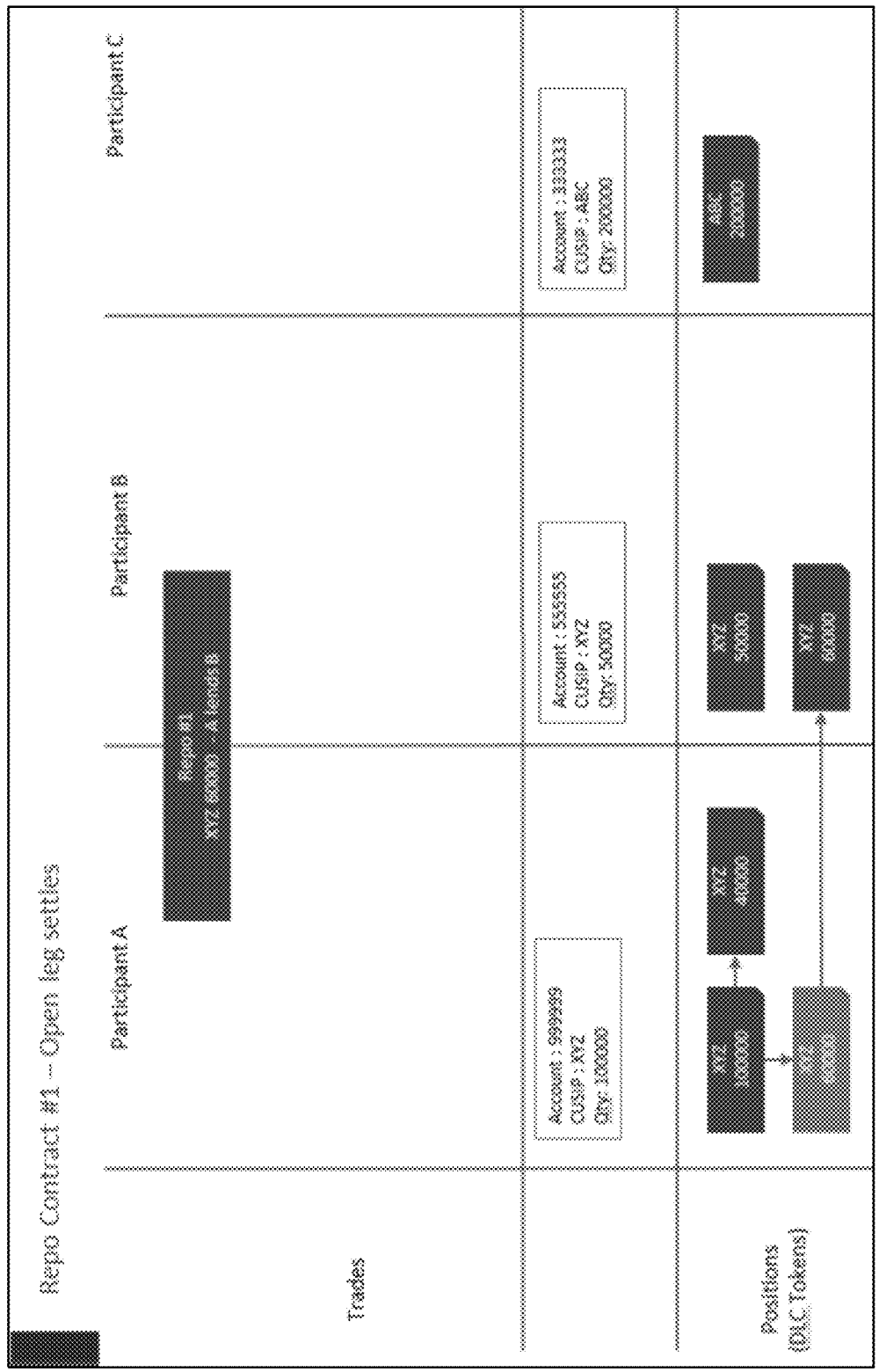
Figure 25:
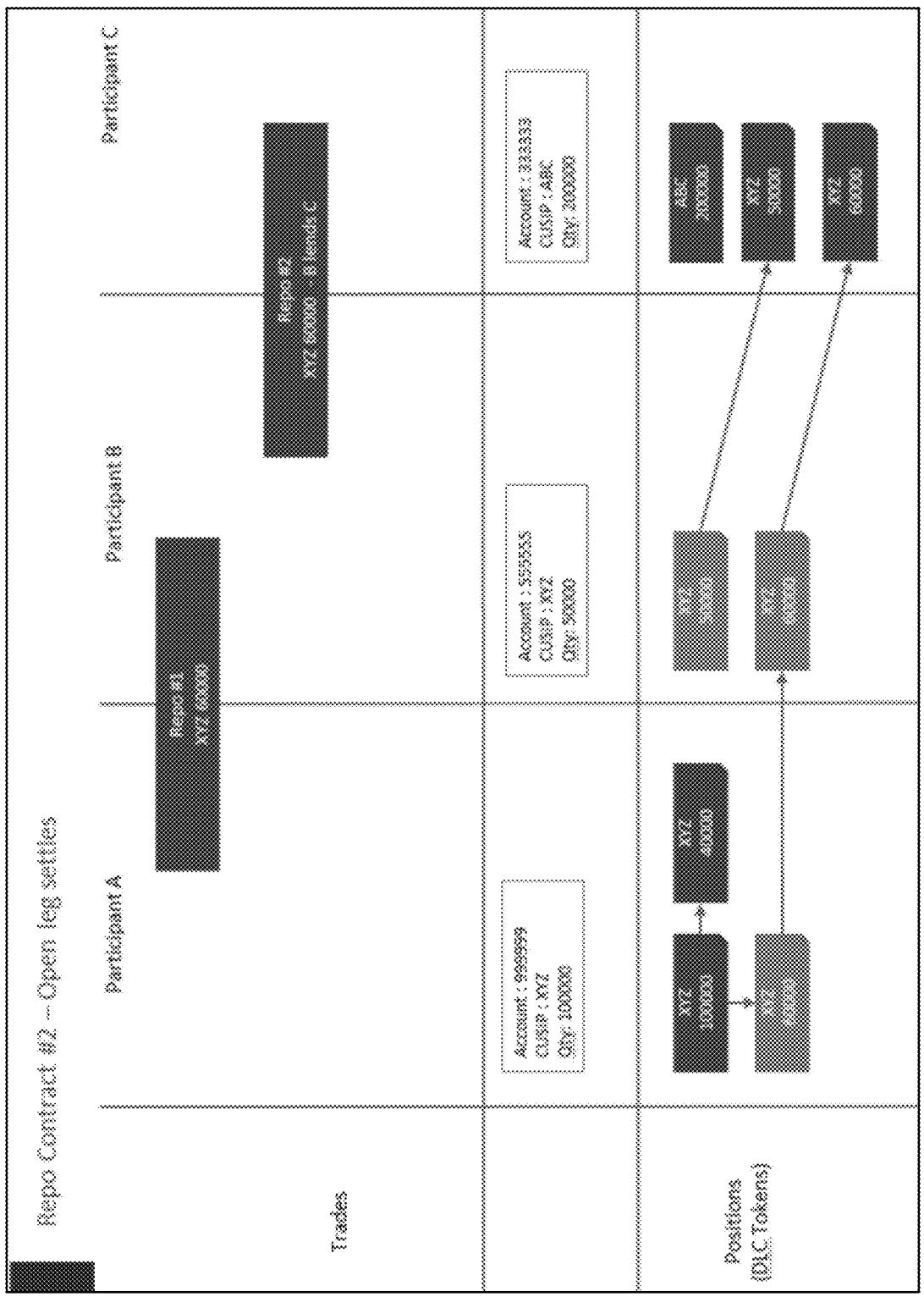

FIG. 12 shows an illustrative example of the inventive token withdrawal.

FIG. 12 shows an illustrative example of the inventive token partial deletion.

In some embodiments and, optionally, in combination of any embodiment described above or below, as detailed herein, the exemplary cryptographically-secured, distributed database-centered computer system may utilize DLC tokens to minimize the amount and frequency of positional data transfer over a computer network while achieving the maximum immobilization and instantaneous settlement.

In some embodiments and, optionally, in combination of any embodiment described above or below, the exemplary cryptographically-secured, distributed database-centered computer system of the present disclosure may be configured to utilize an inventive electronic/digital wallet (e-Wallet) of the present disclosure to manage DLC tokens. In some embodiments and, optionally, in combination of any embodiment described above or below, the exemplary inventive e-Wallet of the present disclosure may have both a software and information component. In some embodiments and, optionally, in combination of any embodiment described above or below, the software may provide security and encryption for the personal information and for the actual transactions. In some embodiments and, optionally, in combination of any embodiment described above or below, the exemplary inventive e-Wallet of the present disclosure may be stored on the client side and/or on the server side and are self-maintained.

In some embodiments and, optionally, in combination of any embodiment described above or below, the exemplary inventive e-Wallets of the present disclosure may be configured to perform at least the following three functions:
1) Bilateral Repo Deal lifecycle management,
2) Asset Tokenization and management, and
3) On-chain Settlement—Transfer of asset tokens on the inventive blockchain distributed ledger (between e-Wallets).

In some embodiments and, optionally, in combination of any embodiment described above or below, the exemplary cryptographically-secured, distributed database-centered computer system of the present disclosure may be configured such that each participant would be only able to see (1) on-the-chain statuses (e.g., e-wallet(s)) of asset position issued on the inventive blockchain distributed ledger, (2)

current owned positions, or both, by using their own unique identity issued by the exemplary inventive system.

In some embodiments and, optionally, in combination of any embodiment described above or below, one or more SESCs (e.g., smart contracts) may be configured to track ownership transfer and that allows a third-party (e.g., a regulator) to track asset ownership. For example, an exemplary Settlement API of FIG. 8 may be programmed to allow external system(s) or API to perform asset token ownership transfer.

For example, one or more SESCs (e.g., smart contracts) may include self-executing code directed to verifying issuance rule(s) such as, but not limited to:
1) checking if a participant has a segregated custody account setup in existing books and record,
2) confirming that a participant, issuing an asset, must locate and move a position (an asset) in a segregated custody account (e.g., locked HIC account of the EOP member node),
3) confirming that the participant can only issue quantity equivalent to the position quantity locked in the segregated custody account (e.g., locked HIC account of the EOP member node), and/or
3) confirming participant's identity and signature.
For example, one or more SESCs (e.g., smart contracts) may include self-executing code directed to verifying settlement conditions such as, but not limited to:
1) checking if DLC tokens with a given CUSIP and quantity are owned and available with a lender party, and/or
2) checking if the available token quantity is greater than required quantity, it would split the token amount into, for example without limitation, two DLC token sub-amounts.

For example, when the Settlement API of the corresponding SESC (e.g., smart contract) is instructed about the token transfer, such function may require, for example, a current owner, CUSIP and quantity details along with new owner details. Then, for example, the Settlement API of the corresponding SESC may be configured to check token availability with the current owner. Next, if the available token quantity is larger than the required token quantity, the Settlement API of the corresponding SESC may be configured to instruct for the token split. For example, if an exemplary amount of DLC tokens of a required quantity is available, the Settlement API of the corresponding SESC may be configured to call a token transfer SESC (e.g., smart contract) to change the ownership. For example, finally, the token transfer would consume an existing token state and create a new token state with new owner.

In some embodiments and, optionally, in combination of any embodiment described above or below, the exemplary cryptographically-secured, distributed database-centered computer system of the present disclosure may be configured such that a withdrawal of the DLC token(s) may proceed in accordance with the following illustrative, non-limiting, example. For example, a participant has a 100 million (100 M) position of CUSIP X in the segregated custody account and a corresponding node has issued equivalent amount of DLC tokens on the inventive blockchain distributed ledger. Now, the participant can transfer some portion of these tokens (30 M) to another participant on the inventive blockchain as part of the repo settlement activity. At the end, the recipient participant would own 30 M tokens on the chain, this allows participant to withdraw 30 M tokens and free-up or unlock 30 M position from its own segregated custody account. For example, the corresponding SESC may be configured to send a withdrawal instruction corresponding financial system and/or client system and destroy the corresponding DLC tokens by making them inactive. For example, as part of the reconciliation process between the token ownership on the inventive blockchain distributed ledger and the segregated custody account, the respective SESC (e.g., smart contract) may be configured to perform reconciliation on 70 M position for CUSIP X.

Illustrative Examples of Utilizing Inventive Tokens with No Rehypothecation

In some embodiments and, optionally, in combination of any embodiment described above or below, the exemplary cryptographically-secured, distributed database-centered computer system of the present disclosure may be configured such that the relevant inventive SESCs (e.g., smart contracts) may be configured to use a trade type and asset and token identifiers to manage the DLC tokens where the rehypothecation of the DLC tokens not allowed to third-party and/or to the same counterparty. For example, a participant can only lend or transfer its own HIC positions. For example, A can lend X tokens to B for a repo deal; however, B cannot lend the same X tokens back to A for another repo deal, and B cannot also lend X tokens to C for another repo deal. FIGS. 14-21 provide illustrative examples of various stages of the DLC tokens lifecycle without rehypothecation that may be managed in accordance with the principles of the present disclosure.

Illustrative Examples of Utilizing Inventive Tokens with Rehypothecation

In some embodiments and, optionally, in combination of any embodiment described above or below, the exemplary cryptographically-secured, distributed database-centered computer system of the present disclosure may be configured such that the relevant inventive SESCs (e.g., smart contracts) may be configured to use a trade type and asset and token identifiers to manage the DLC tokens where the rehypothecation of the DLC tokens to third-party and/or to the same counterparty is allowed. For example, the exemplary cryptographically-secured, distributed database-centered computer system of the present disclosure may be configured such that a participant can transfer any token with given CUSIP across the inventive blockchain distributed ledger. FIGS. 22-25 provide illustrative examples of various stages of the DLC tokens lifecycle with rehypothecation that may be managed in accordance with the principles of the present disclosure.

Illustrative Examples of Inventive Data Structures

In some embodiments and, optionally, in combination of any embodiment described above or below, the exemplary cryptographically-secured, distributed database-centered computer system of the present disclosure may operate based on one or more of the data structures (e.g., in SESCs) that incorporate nested JSON structures. For example, the exemplary cryptographically-secured, distributed database-centered computer system of the present disclosure may include a Repo Trade object whose features are programmed as a compilation of JSON objects where each feature has a corresponding JSON object. Table 1 shows an illustrative example of representative features of the Repo trade object.

TABLE 1

| | | |
|---|---|---|
| Party | string | `json:"Party,omitempty"` |
| PartyCustodian | string | `json:"PartyCustodian,omitempty"` |
| Counterparty | string | `json:"Counterparty,omitempty"` |
| CounterpartyCustodian | string | `json:"CounterpartyCustodian,omitempty"` |
| RepoStatus | string | `json:"RepoStatus,omitempty"` |
| TransactionDate | string | `json:"TransactionDate,omitempty"` |

TABLE 1-continued

| TransactionTimestamp | string `json:"TransactionTimestamp,omitempty"` |
| ContractualValueDate | string `json:"ContractualValueDate,omitempty"` |
| CloseEventDate | string `json:"CloseEventDate,omitempty"` |

For example, the exemplary cryptographically-secured, distributed database-centered computer system of the present disclosure may utilize similar inventive objects to manage collateral and tokens. Table 2 shows an illustrative example of representative features of the DLC Token object.

Figure 26:
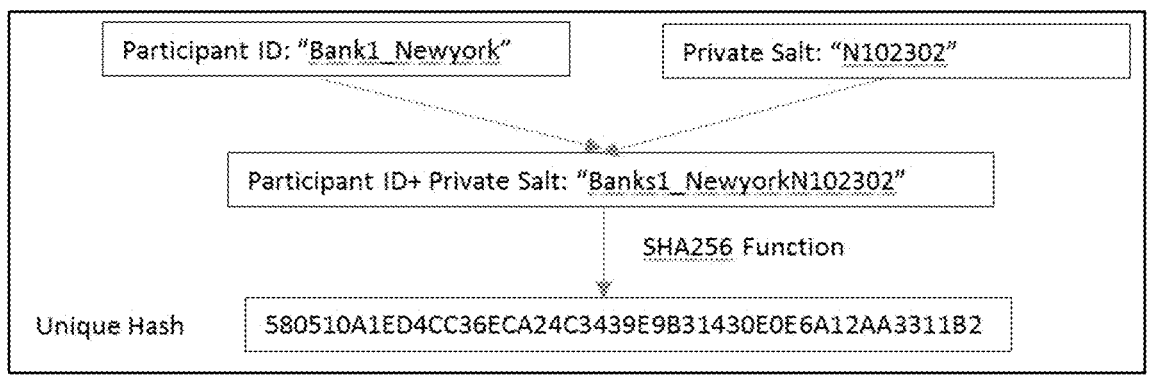

In some embodiments and, optionally, in combination of any embodiment described above or below, each DLC token's parameter that is representative of owner's identification value (e.g., participant's unique identifier) may be in the form of a hashed value with private salt as illustrated in FIG. 26. In some embodiments and, optionally, in combination of any embodiment described above or below, only SESCs (e.g., smart contracts) may be able to generate this unique hash. In some embodiments and, optionally, in combination of any embodiment described above or below, in turn, SESCs (e.g., smart contracts) that did not generate the particular participant's unique identifier can only read and identity token ownership. Consequently, such technological solution would result in making ownership information to be anonymous and any party that chooses to read or steal a data would not be able to understand the resulting data (e.g., party and account numbers.)

TABLE 2

| assetTokenIdentifier | string `json:"TokenId,omitempty"` |
| instrumentID | string `json:"instrID,omitempty"` |
| ownerParty | string `json:"ownerPartyID,omitempty"` |
| positionQty | string `json:"Qty,omitempty"` |
| transferDateTime | string `json:"issueDate,omitempty"` |

In some embodiments and, optionally, in combination of any embodiment described above or below, the plurality of SESCs includes: a plurality of repurchasing contract SESCs, where each repurchasing contract SESC is at least configured to: obtain current repurchasing contract data for a particular repurchasing contract from at least one electronic source associate with at least one EOP member node; perform the at least one explicit policy criteria check associated with at least one of the at least one electronic source, the at least one EOP member node, and the current repurchasing contract data; obtain electronic signatures from all parties to the particular repurchasing contract; generate at least one repurchasing contract state hash representative the current repurchasing contract data; store the at least one repurchasing contract state hash and the current repurchasing contract data of the particular repurchasing contract in at least one repurchasing contract persistent data object in the at least one distributed database; keep the at least one repurchasing contract state hash within the repurchasing contract SESC; substitute at least one first collateral being used in the particular repurchasing contract for another collateral; and generate an output representative of a current state of the particular repurchasing contract.

In some embodiments and, optionally, in combination of any embodiment described above or below, the at least some embodiments of the present disclosure provide an exemplary system that includes at least the following components: a distributed blockchain environment, including: i) a plurality of externally owned presence (EOP) member nodes associated with a plurality of distinct entities, where each EOP member node including one or more computers associated with at least one distinct entity; ii) one or more cryptographically-secured distributed ledgers, storing a plurality of persistent data objects across the one or more computers of the EOP member nodes; iii) a plurality of electronic wallets (e-Wallets), configured to hold one or more data records of distributed leger collateral (DLC) tokens, where the computers of the EOP member are configured to administer one or more respective e-Wallets of the plurality of e-Wallets; iv) a plurality of self-contained self-executing software containers (SESCs), including: 1) one or more first-type SESCs, where each first-type SESC includes a plurality of persistent software routines configured to: a) create a plurality of persistent SESC data objects storing distinct data items of at least one transaction between a plurality of entities in the one or more cryptographically-secured distributed ledgers, where the at least one transaction involves one or more assets, and b) update the distinct data items of the at least one transaction in one or more respective persistent SESC data objects; 2) one or more second-type SESCs, where each second-type SESC includes one or more persistent task-specific software routines configured to be invoked by one or more persistent software routines of the first-type SESC to update one or more respective distinct data items of the at least one transaction based on each respective task to be performed by one or more persistent software routines of the first-type SESC with the one or more respective distinct data items; and 3) one or more third-type SESCs, where each third-type SESC includes: one or more persistent token-specific software routines configured to administer the DLC tokens within the distributed blockchain environment, where the DLC tokens are used by the distributed blockchain environment to substitute one or more first assets of at least one first party for one or more second assets of at least one second party in the at least one transaction; where the one or more first-type SESCs, the one or more second-type SESCs, and the one or more third-type SESCs are distinct SESCs; where each DLC token include at least one unique entity-identifying cryptographic hash; where, for each respective transaction associated with a respective EOP member node, the one or more computers of the respective EOP member node are configured to invoke i) the one or more first-type SESCs and ii) the one or more third-type SESCs to cryptographically administer each respective transaction within the distributed blockchain environment.

In some embodiments and, optionally, in combination of any embodiment described above or below, the at least some embodiments of the present disclosure provide and exemplary method that includes at least the steps of: administering, by one or more computers, a plurality of externally owned presence (EOP) member nodes associated with a plurality of distinct entities; administering, by the one or more computers, one or more cryptographically-secured distributed ledgers, storing a plurality of persistent data objects across an distributed blockchain environment of the EOP member nodes; administering, by the one or more computers, a plurality of electronic wallets (e-Wallets), configured to hold one or more data records of distributed leger collateral (DLC) tokens; administering, by the one or more computers, a plurality of self-contained self-executing software containers (SESCs), including: 1) one or more first-type SESCs, where each first-type SESC includes a plurality of persistent software routines configured to: a) create a plurality of persistent SESC data objects storing distinct data items of at least one transaction between a plurality of entities in the one or more cryptographically-secured distributed ledgers, where the at least one transaction involves one or more assets, and b) update the distinct data items of the at least one transaction in one or more respective persistent SESC data objects; 2) one or more second-type SESCs, where each second-type SESC includes one or more persistent task-specific software routines configured to be invoked by one or more persistent software routines of the first-type SESC to update one or more respective distinct data items of the at least one transaction based on each respective task to be performed by one or more persistent software routines of the first-type SESC with the one or more respective distinct data items; and 3) one or more third-type SESCs, where each third-type SESC includes: one or more persistent token-specific software routines configured to administer the DLC tokens within the distributed blockchain environment, where the DLC tokens are used by the distributed blockchain environment to substitute one or more first assets of at least one first party for one or more second assets of at least one second party in the at least one transaction; where the one or more first-type SESCs, the one or more second-type SESCs, and the one or more third-type SESCs are distinct SESCs; where each DLC token include at least one unique entity-identifying cryptographic hash; and administering, by the one or more computers, each respective transaction within the distributed blockchain environment in response to the one or more first-type SESCs and the one or more third-type SESCs being invoked by a respective EOP member node.

In some embodiments and, optionally, in combination of any embodiment described above or below, the one or more third-type SESCs is configured to: i) generate respective amounts of the DLC tokens respectively associated with the one or more first assets and the one or more second assets, and ii) store the respective amounts of the DLC tokens in respective eWallets of the at least one first party and the at least one second party.

In some embodiments and, optionally, in combination of any embodiment described above or below, for the at least one transaction, the plurality of persistent software routines of the one or more first-type SESCs is configured to invoke the one or more third-type SESCs to lock at least one portion of each respective amount of the DLC tokens in the respective eWallets to form respective locked DLC tokens.

In some embodiments and, optionally, in combination of any embodiment described above or below, the plurality of persistent software routines of the one or more first-type SESCs is configured to: i) invoke the one or more third-type SESCs to transfer the respective locked DLC tokens between the respective eWallets to substitute the one or more first assets of the at least one first party for the one or more second assets of the at least one second party in the at least one transaction, and ii) cryptographically record the substitution in one or more persistent SESC data objects associated with the at least one transaction.

In some embodiments and, optionally, in combination of any embodiment described above or below, the at least one transaction is an asset repurchasing transaction.

In some embodiments and, optionally, in combination of any embodiment described above or below, the one or more first assets of the at least one first party and the one or more second assets of the at least one second party are collateral assets in the asset repurchasing transaction.

In some embodiments and, optionally, in combination of any embodiment described above or below, the one or more first assets of the at least one first party and the one or more second assets of the at least one second party are assets of distinct types.

In some embodiments and, optionally, in combination of any embodiment described above or below, the one or more first assets of the at least one first party and the one or more second assets of the at least one second party are assets of distinct types.

In some embodiments and, optionally, in combination of any embodiment described above or below, the one or more first assets of the at least one first party and the one or more second assets of the at least one second party are recorded in respective hold-in-custody accounts of respective EOP member nodes.

In some embodiments and, optionally, in combination of any embodiment described above or below, the respective eWallets of the at least one first party and the at least one second party include the respective hold-in-custody accounts.

In some embodiments and, optionally, in combination of any embodiment described above or below, the one or more third-type SESCs is configured to: i) generate respective amounts of the DLC tokens respectively associated with the one or more first assets and the one or more second assets, and ii) store the respective amounts of the DLC tokens in respective eWallets of the at least one first party and the at least one second party.

In some embodiments and, optionally, in combination of any embodiment described above or below, a first eWallet of the at least one first party, a second eWallet of the at least one second party, or both store one or more respective amounts of the DLC tokens received in at least one other transaction with at least one third party.

In some embodiments and, optionally, in combination of any embodiment described above or below, the at least one third party is either the at least one first party or the at least one second party respectively when the at least one other transaction is between the at least one first party and the at least one second party.

While a number of embodiments of the present disclosure have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A system comprising:
   a distributed blockchain environment, comprising:
   i) a plurality of externally owned presence (EOP) member nodes associated with a plurality of distinct entities, wherein each EOP member node of the plurality of EOP member nodes comprising one or more computers associated with at least one distinct entity, each of the one or more computers comprising one or more non-transitory storage media;
   the one or more non-transitory storage media of the one or more computers of each of the EOP member nodes storing:
   ii) one or more cryptographically-secured distributed ledgers storing a plurality of immutable data objects;
   iii) a plurality of data records associated with a plurality of distributed ledger collateral (DLC) tokens;
   iv) the plurality of DLC tokens;
   v) a plurality of self-contained self-executing software containers (SESCs), the plurality of SESCs comprising:
   1) One or more first-type SESCs, comprising a plurality of transaction-specific software routines that, when executed by the one or more computers of each of the EOP member nodes, causes the one or more computers to perform the operations of:

a) creating plurality of immutable data objects on the one or more cryptographically-secured distributed ledgers, storing distinct data items for at least one transaction between a plurality of entities in the one or more cryptographically-secured distributed ledgers, wherein the at least one transaction involves an exchange of one or more assets, b) executing the at least one transaction according to the distinct data items to exchange the one or more assets, c) updating the distinct data items for the at least one transaction in one or more respective data objects according to the exchange, and d) storing the plurality of DLC tokens in respective data records of at least one first party and at least one second party, each of the plurality of DLC tokens comprising at least one unique entity-identifying cryptographic hash;

2) One or more second-type SESCs, comprising one or more task-specific software routines that, when executed by the one or more computers of each of the EOP member nodes, causes the one or more computers to perform the operations of: updating one or more respective distinct transaction records with the distinct data items of the plurality of data objects so as to record, on the one or more cryptographically-secured distributed ledgers, a state of the one or more first-type SESCs upon each respective execution of each respective at least one transaction; and 3) One or more third-type SESCs, comprising one or more token-specific software routines that, when executed by the one or more computers of each of the EOP member nodes, causes the one or more computers to perform the operations of: splitting a respective token of the plurality of DLC tokens into a first DLC token and a DLC second token, wherein the splitting comprises generating the first DLC token and second DLC token each having a unique entity-identifying cryptographic hash, checking, from the first token and the second token, the first token and second token as corresponding to a tokenized asset associated with the at least one transaction, based on the check of the first and second token value, creating a new token state for the at least one transaction between the plurality of entities in the one or more cryptographically-secured distributed ledgers to substitute at least one first tokenized asset of at least one first party for one or more second tokenized assets of the least one second party according to the at least one transaction, modifying, the respective token of the plurality of DLC tokens to be in a locked state that locks the respective token from one or more additional transaction until the completion of the at least one transaction, deleting at least one DLC token of the plurality of DLC tokens in response to creating the new token state for the at least one transaction;

wherein a respective total value of the respective token corresponds to a respective total value of a respective asset defined in at least one distinct data item of at least one data object of the plurality of data objects of the at least one transaction;

wherein the plurality of DLC tokens comprise a plurality of tokenized assets associated with the at least one transaction;

wherein the one or more first-type SESCs, the one or more second-type SESCs, and the one or more third-type SESCs are distinct SESCs;

wherein, for each respective transaction associated with a respective EOP member node of the plurality of EOP member nodes, the one or more computers of the respective EOP member node invoke i) the one or more first-type SESCs and ii) the one or more third-type SESCs.

2. The system of claim 1, wherein, the one or more third-type SESCs, when executed by the one or more computers of each of the EOP member nodes, cause the one or more computers to perform an operation of:

i) generating respective amounts of the plurality of DLC tokens respectively associated with one or more first assets and one or more second assets.

3. The system of claim 2, wherein, for the at least one transaction, the plurality of software routines of the one or more first-type SESCs, when executed by the one or more computers of each of the EOP member nodes, cause the one or more computers to perform the operation of: invoking the one or more third-type SESCs to lock each respective amount of the plurality of DLC tokens in the respective data records to form a respective plurality of locked DLC tokens.

4. The system of claim 3, wherein the plurality of software routines of the one or more first-type SESCs, when executed by the one or more computers of each of the EOP member nodes, cause the one or more computers to perform the operation of:

i) invoking the one or more third-type SESCs to transfer the respective locked DLC tokens between the respective data records to substitute the one or more first assets of the at least one first party for the one or more second assets of the at least one second party in the at least one transaction, and ii) cryptographically recording the substitution in one or more immutable SESC data objects associated with the at least one transaction.

5. The system of claim 1, wherein the at least one transaction is an asset repurchasing transaction.

6. The system of claim 5, wherein the one or more first assets of at least one first party and the one or more second assets of at least one second party are collateral assets in the asset repurchasing transaction.

7. The system of claim 1, wherein the one or more first assets of at least one first party and the one or more second assets of at least one second party are assets of distinct types.

8. The system of claim 6, wherein the one or more first assets of the at least one first party and the one or more second assets of the at least one second party are assets of distinct types.

9. The system of claim 2, wherein the one or more first assets of the at least one first party and the one or more second assets of the at least one second party are associated with respective hold-in-custody accounts of respective EOP member nodes.

10. The system of claim 9, wherein the respective data records of the at least one first party and the at least one second party comprise the respective hold-in-custody accounts.

11. The system of claim 1, wherein the one or more third-type SESCs, when executed by the one or more computers of each of the EOP member nodes, cause the one or more computers to perform an operation of:
  i) generating respective amounts of the plurality of DLC tokens respectively associated with one or more first assets associated with at least one first party and one or more second assets associated with at least one second party.

12. The system of claim 2, wherein a first data record of the at least one first party, a second data record of the at least one second party, or both, store one or more respective amounts of the DLC tokens received in at least one other transaction with at least one other party.

13. A method comprising:
  instantiating, by one or more computers associated with a plurality of externally owned presence (EOP) member nodes associated with a plurality of distinct entities, one or more cryptographically-secured distributed ledgers of a distributed blockchain environment;
    wherein the one or more cryptographically-secured distributed ledgers store a plurality of immutable data objects and a plurality of data records associated with a plurality of distributed leger collateral (DLC) tokens;
  executing, by the one or more computers, a plurality of transaction-specific software routines of one or more first-type SESCs wherein executing the plurality of transaction-specific software routines of one or more first-type SESCs comprises:
    a) creating, by the plurality of transaction-specific software routines of one or more first-type SESCs, create the plurality of immutable data objects on the one or more cryptographically-secured distributed ledgers storing distinct data items for at least one transaction between a plurality of entities in the one or more cryptographically-secured distributed ledgers, wherein the at least one transaction involves an exchange of one or more assets,
    b) executing, by the plurality of transaction-specific software routines of one or more first-type SESCs, the at least one transaction according to the distinct data items to exchange the one or more assets, and
    c) updating, by the plurality of transaction-specific software routines of one or more first-type SESCs, the distinct data items for the at least one transaction in one or more respective immutable data objects according to the exchange, and
    d) storing, by the plurality of transaction-specific software routines of one or more first-type SESCs, the plurality of DLC tokens in respective data records of at least one first party and at least one second party, each of the plurality of DLC tokens comprising at least one unique entity-identifying cryptographic hash;
  executing, by the one or more computers, one or more task-specific software routines of one or more second-type SESCs, wherein executing the one or more task-specific software routines of one or more second-type SESCs comprises: updating, by the one or more task-specific software routines of one or more second-type SESCs, one or more respective distinct transaction records with the distinct data items of the plurality of immutable data objects so as to record, on the one or more cryptographically-secured distributed ledgers, a state of the one or more first-type SESCs upon each respective execution of each respective at least one transaction; and
  executing, by the one or more computers, one or more token-specific software routines of one or more third-type SESCs, wherein executing the one or more token-specific software routines of one or more third-type SESCs comprises:
    splitting, by the one or more token-specific software routines of one or more third-type SESCs, a respective token of the plurality of DLC tokens into a first DLC token and a second DLC token, wherein the splitting comprises generating the first DLC token and second DLC token each having a unique entity-identifying cryptographic hash,
    checking, by the one or more token-specific software routines of one or more third-type SESCs, from the first token and the second token, the first token or second token as corresponding to a tokenized asset associated with the at least one transaction,
    based on the check of the first or second token, creating, by the one or more token-specific software routines of one or more third-type SESCs, a new token state for the at least one transaction between the plurality of entities in the one or more cryptographically-secured distributed ledgers to substitute at least one first tokenized asset of at least one first party for one or more second tokenized assets of the least one second party according to the at least one transaction,
    modifying, by the one or more token-specific software routines of one or more third-type SESCs, the respective token of the plurality of DLC tokens to be in a locked state that locks the respective token from one or more additional transaction until the completion of the at least one transaction, and
    deleting, by the one or more token-specific software routines of one or more third-type SESCs, at least one DLC token of the plurality of DLC tokens in response to creating the new token state for the at least one transaction;
  wherein a respective total value of the respective token corresponds to a respective total value of a respective asset defined in at least one distinct data item of at least one data object of the plurality of data objects of the at least one transaction;
  wherein the plurality of DLC tokens comprise a plurality of tokenized assets associated with the at least one transaction;
  wherein the one or more first-type SESCs, the one or more second-type SESCs, and the one or more third-type SESCs are distinct SESCs.

14. The method of claim 13, further comprising:
  i) generating, by the one or more third-type SESCs, respective amounts of the plurality of DLC tokens respectively associated with one or more first assets associated with at least one first party and one or more second assets associated with at least one second party, and
  ii) storing, by the one or more third-type SESCs to store the respective amounts of the plurality of DLC tokens in respective data records of the at least one first party and the at least one second party.

15. The method of claim 14, further comprising:
invoking, by the one or more computers via the plurality of software routines of the one or more first-type SESC, the one or more third-type SESCs to lock at least one portion of each respective amount of the plurality of DLC tokens in the respective data records to form a respective plurality of locked DLC tokens.

16. The method of claim 15, further comprising:
i) transferring, by the one or more computers executing the one or more third-type SESCs, the respective locked DLC tokens between the respective data records to substitute the one or more first assets of the at least one first party for the one or more second assets of the at least one second party in the at least one transaction, and
ii cryptographically recording, by the one or more computers executing the plurality of software routines of the one or more first-type SESCs, the substitution in one or more immutable SESC data objects associated with the at least one transaction.

17. The method of claim 13, wherein the at least one transaction is an asset repurchasing transaction.

18. The method of claim 17, wherein the one or more first assets of at least one first party and the one or more second assets of at least one second party are collateral assets in the asset repurchasing transaction.

19. The method of claim 13, wherein the one or more first assets of at least one first party and the one or more second assets of at least one second party are assets of distinct types.

20. The method of claim 18, wherein the one or more first assets of the at least one first party and the one or more second assets of the at least one second party are assets of distinct types.

21. The method of claim 14, wherein the one or more first assets of the at least one first party and the one or more second assets of the at least one second party are associated with respective hold-in-custody accounts of respective EOP member nodes.

22. The method of claim 21, wherein the respective data records of the at least one first party and the at least one second party comprise the respective hold-in-custody accounts.

23. The method of claim 13, further comprising:
i) generating, by the one or more computers executing the one or more third-type SESCs, respective amounts of the plurality of DLC tokens respectively associated with one or more first assets associated with at least one first party and one or more second assets associated with at least one second party, and
ii) storing, by the one or more computers executing the one or more third-type SESCs, the respective amounts of the plurality of DLC tokens in respective data records of the at least one first party and the at least one second party.

24. The method of claim 14, wherein a first data record of the at least one first party, a second data record of the at least one second party, or both store one or more respective amounts of the DLC tokens received in at least one other transaction with at least one third party.

\* \* \* \* \*